United States Patent
Takagi et al.

(10) Patent No.: US 10,917,165 B2
(45) Date of Patent: Feb. 9, 2021

(54) BASE STATION ARCHITECTURE INTEGRATING SATELLITE-BASED CONTENT DELIVERY WITH 4G/LTE MOBILE NETWORK

(71) Applicant: Intelsat US LLC, McLean, VA (US)

(72) Inventors: Ken Takagi, Vienna, VA (US); Ruben Andres Calzadilla, Potomac, MD (US); Nene Fatoumata Diallo, Lawrenceville, GA (US)

(73) Assignee: INTELSAT US LLC, McLean, VA (US)

( * ) Notice: Subject to any disclaimer, the term of this patent is extended or adjusted under 35 U.S.C. 154(b) by 0 days.

(21) Appl. No.: 16/460,342

(22) Filed: Jul. 2, 2019

(65) Prior Publication Data

US 2020/0007226 A1 Jan. 2, 2020

Related U.S. Application Data

(60) Provisional application No. 62/693,047, filed on Jul. 2, 2018.

(51) Int. Cl.
*H04B 7/185* (2006.01)
*H04L 12/18* (2006.01)
*H04W 88/16* (2009.01)

(52) U.S. Cl.
CPC ..... *H04B 7/18526* (2013.01); *H04B 7/18539* (2013.01); *H04B 7/18558* (2013.01);
(Continued)

(58) Field of Classification Search
CPC ............ H04B 7/18526; H04B 7/18539; H04B 7/18558; H04B 7/18584; H04B 7/18573; H04L 12/189; H04W 88/16
(Continued)

(56) References Cited

U.S. PATENT DOCUMENTS 6,400,696 B1 6/2002 Hreha
6,889,032 B2 5/2005 Dao et al.
(Continued)

FOREIGN PATENT DOCUMENTS

| CN | 103546477 A | 1/2014 |
| WO | 2013038167 A2 | 3/2013 |
| WO | 2015153587 A1 | 10/2015 |

OTHER PUBLICATIONS

Kalantari, Ashkan et al: "Cache-Assisted Hybrid Satellite-Terrestrial Backhauling for 5G Cellular Networks", GLOBECOM 2017—2017 IEEE Global Communications Conference, IEEE, Dec. 4, 2017, (6 pages total).
(Continued)

*Primary Examiner* — Faisal Choudhury
(74) *Attorney, Agent, or Firm* — Sughrue Mion, PLLC

(57) ABSTRACT

A base station is provided. The base station includes a base band unit and one or more remote radio heads, a satellite-based content delivery network (S-CDN) device, and a local serving gateway (LS-GW). The base station unit and the one or more remote radio heads wirelessly communicate with a user equipment. The S-CDN device receives and caches content from a satellite-based content delivery network. The LS-GW is connected to the S-CDN device and the base band unit. The LS-GW receives a request for content from the user equipment, determines whether the content is already stored in the S-CDN device, and when the content is already stored in the S-CDN device, delivers the content to the user equipment from the S-CDN device.

20 Claims, 17 Drawing Sheets

(52) U.S. Cl.
CPC ..... *H04B 7/18573* (2013.01); *H04B 7/18584* (2013.01); *H04L 12/189* (2013.01); *H04W 88/16* (2013.01)

(58) Field of Classification Search
USPC ....................................................... 370/316
See application file for complete search history.

(56) References Cited

U.S. PATENT DOCUMENTS

| | | | |
|---|---|---|---|
| 8,804,494 | B1 | 8/2014 | Uberoy |
| 8,982,841 | B2 | 3/2015 | Srinivasan |
| 9,226,333 | B2 | 12/2015 | Steiner et al. |
| 9,479,934 | B2 | 10/2016 | Agarwal et al. |
| 9,642,077 | B2 | 5/2017 | Mathai et al. |
| 9,652,277 | B2 | 5/2017 | Broustis et al. |
| 9,722,877 | B2 | 8/2017 | Uberoy et al. |
| 9,817,684 | B2 | 11/2017 | Rajan et al. |
| 2002/0124098 | A1 | 9/2002 | Shaw |
| 2002/0131428 | A1 | 9/2002 | Pecus et al. |
| 2002/0136201 | A1 | 9/2002 | Buchsbaum et al. |
| 2002/0152318 | A1 | 10/2002 | Menon et al. |
| 2005/0273822 | A1 | 12/2005 | Snell et al. |
| 2007/0204314 | A1 | 8/2007 | Hasek et al. |
| 2007/0255829 | A1 | 11/2007 | Pecus et al. |
| 2008/0064328 | A1 | 3/2008 | Wesel |
| 2008/0123738 | A1 | 5/2008 | Katsavounidis et al. |
| 2009/0158362 | A1 | 6/2009 | Kajos |
| 2010/0031285 | A1 | 2/2010 | Haberman et al. |
| 2010/0177642 | A1 | 7/2010 | Sebastian et al. |
| 2013/0024267 | A1 | 1/2013 | Libenson et al. |
| 2013/0029708 | A1* | 1/2013 | Fox ...................... H04W 24/02 455/509 |
| 2014/0057549 | A1* | 2/2014 | Ling .................. H04B 7/18513 455/3.02 |
| 2015/0191835 | A1 | 7/2015 | Khdary et al. |
| 2015/0271541 | A1* | 9/2015 | Gonder ............ H04N 21/26258 725/134 |
| 2017/0094526 | A1 | 3/2017 | Forte |
| 2017/0195450 | A1* | 7/2017 | Su .................... H04N 21/26291 |
| 2018/0176656 | A1* | 6/2018 | Baudoin ............ H04N 21/6193 |
| 2019/0289350 | A1* | 9/2019 | Gates .................... H04L 65/604 |

OTHER PUBLICATIONS

"3rd Generation Partnership Project; Technical Specification Group Services and System Aspects; Local IP Access and Selected IP Traffic Offload (LIPA-SIPTO); (Release 10)", 3GPP Standard; 3GPP TR 23.829, 3rd Generation Partnership Project (3GPP), Mobile Competence Centre ; 650, Route Des Lucioles ; F-06921 Sophia-Antipolis Cedex; France, No. V10.0.0, Mar. 29, 2011 , pp. 1-43 (44 pages total).

International Search Report dated Oct. 23, 2019, in International Application No. PCT/US2019/040241.

Written opinion of the International Searching Authority dated Oct. 23, 2019 in International Application No. PCT/US2019/040241.

Xiaofei Wang, et al., "Cache in the Air: Exploiting Content Caching and Delivery Techniques for 5G Systems" IEEE Communications Magazine, Feb. 2014, pp. 131-139.

Wouter Tevernier, "5G Communication with a Heterogeneous, Agile Mobile network in the Pyeongchang Winter Olympic competition", Mar. 2017, 54 pages.

Xiu Li, et al., "CaaS: Caching as a Service for 5G Networks", IEEE Access, Mar. 30, 2017, pp. 5982-5993, vol. 5.

Karina Gomez, et al., "Aerial Base Stations with Opportunistic Links for Next Generation Emergency Communications", IEEE Communications Magazine, Apr. 2016, pp. 31-39.

Can Altay, et al., "Standalone eNode-B Design with Integrated Virtual EPC in Public Safety Networks", IEEE/IFIP Network Operations and Management Symposium, Apr. 2016, pp. 731-734.

"Cisco Satellite Services Platform: Evolved Packet Core Satellite Radio Access Network", Cisco EPC Satellite RAN Solution, 2013, 2 pages.

Laurent Reynaud, "Quality of Service for LTE Public Safety Networks with Satellite Backhaul", 27th Annual IEEE International Symposium on Personal, Indoor and Mobile Radio Communications— (PIMRC): Mobile, 2016, 6 pages. and Wireless Networks.

Karina Gomez, et al., "FME: A Flexible Management Entity for Virtualizing LTE Evolved Packet Core", IEEE, 2014, 4 pages.

Communication dated Aug. 23, 2018 issued by the European Patent Office in counterpart application No. 155774468.1.

Communication dated May 22, 2018 issued by the State Intellectual Property Office of People's Republic of China in counterpart application No. 155774468.1.

Communication dated Oct. 5, 2017, from the European Patent Office in counterpart European Application No. 15774468.1.

International Search Report of PCT/US2015/023554 dated Jul. 6, 2015.

Written Opinion of the International Searching Authority of PCT/US2015/023554 dated Jul. 6, 2015.

International Preliminary Report on Patentability of PCT/US2015/023554 dated Jun. 16, 2016.

\* cited by examiner

BASE STATION ARCHITECTURE INTEGRATING SATELLITE-BASED CONTENT DELIVERY WITH 4G/LTE MOBILE NETWORK

CROSS-REFERENCE TO RELATED APPLICATION

This application claims the benefit of priority under 35 U.S.C. § 119(e) of U.S. Ser. No. 62/693,047, filed Jul. 2, 2018, the entire contents of which is herein incorporated by reference.

BACKGROUND

1. Technical Field

Example embodiments relate to integrating satellite-based content delivery with 4G/LTE technology in a mobile network base station located at an edge of the mobile network and, more particularly, to a base station, a server, and a system providing such integration.

2. Description of the Related Art

Related art appliance-based 4G/LTE system architectures require that a data plane on a typical mobile network be encrypted between a mobile network operator (MNO) hub location that hosts an evolved packet core (EPC), and a user equipment (UE). Such encryption from MNO hub to UE requires a complex process to remove the encryption, insert/re-enable data, and then repackage and re-encrypt the data at mid-point locations such as at an eNodeB. Due to this, to the extent that a satellite-based content delivery network (S-CDN) has been integrated into a terrestrial-based mobile network, the S-CDN has been implemented at the MNO hub location. It has hitherto been impractical to integrate S-CDN at 4G/LTE edge locations that are closer to the edge of the mobile network than the MNO hub location.

The integration of an S-CDN system at a 4G/LTE mobile network edge location has hitherto not been achieved.

SUMMARY

It is an aspect to provide integration of satellite-based content delivery at edge locations in a 4G/LTE mobile network.

According to an aspect of one or more example embodiments, there is provided a radio base station. The base station includes a base band unit and one or more remote radio heads configured to wirelessly communicate with a user equipment (UE); a satellite-based content delivery network (S-CDN) device that receives and caches content from an S-CDN; and a local serving gateway (LS-GW) connected to the S-CDN device and the base band unit, wherein the LS-GW receives a request for content from the UE, determines whether the content is already stored in the S-CDN device, and when the content is already stored in the S-CDN device, delivers the content to the UE from the S-CDN device.

According to other aspects of one or more example embodiments, there is also provided a server and a system consistent with the radio base station.

BRIEF DESCRIPTION OF THE DRAWINGS

Example embodiments will be described below with reference to the accompanying drawings, in which.

DETAILED DESCRIPTION

Figure 1:
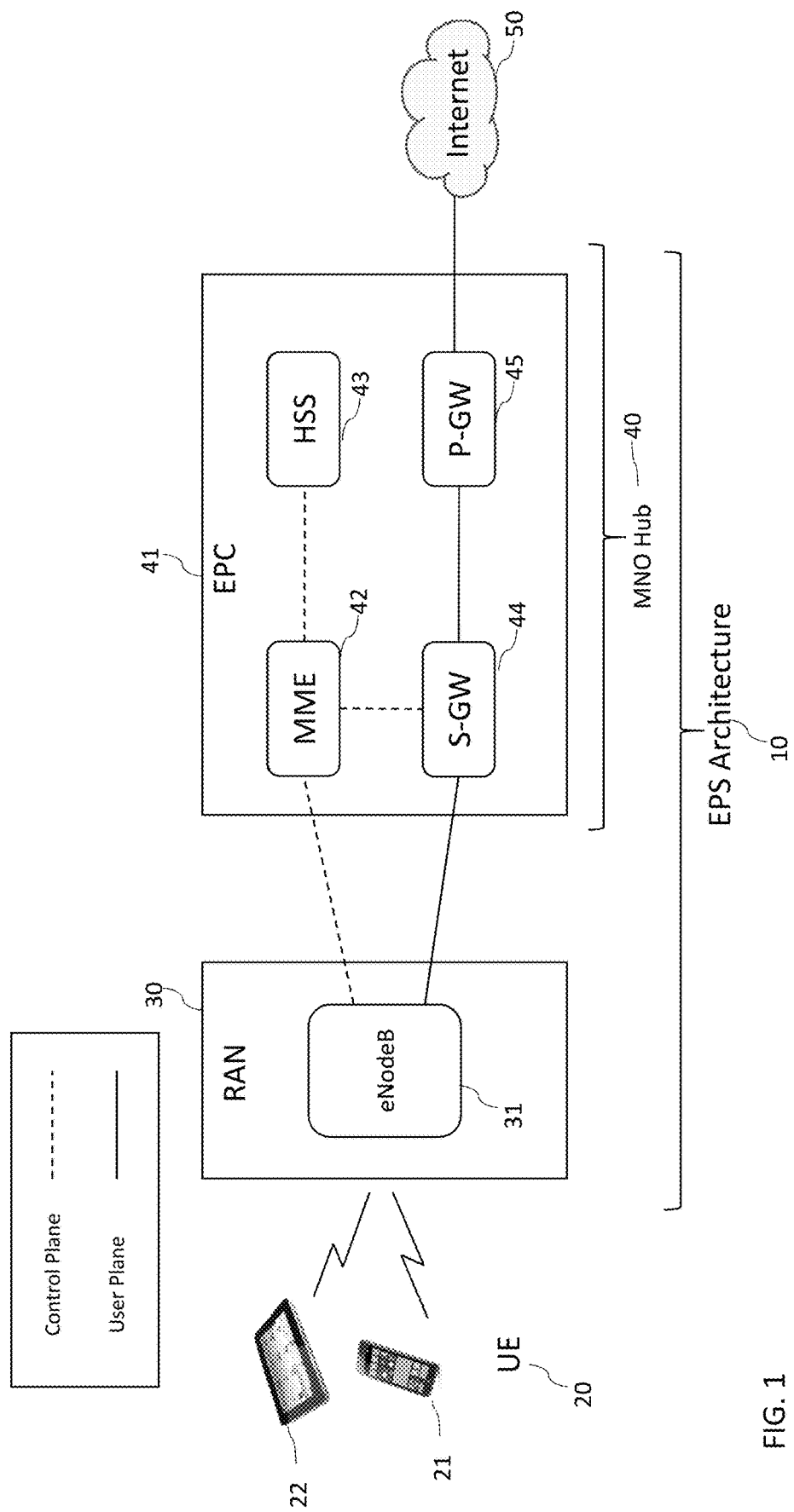
FIG. 1 is a diagram illustrating a related art Evolved Packet System (EPS) architecture.

Example embodiments improve the performance of delivering popular and high resolution/bandwidth-intensive content over a 4G/LTE mobile network to end-users by deploying a creative network design utilizing virtualized evolved packet core (vEPC) technology, and integrating such a mobile network layout with a satellite-based content delivery network (S-CDN) system to provide content delivery, video processing and caching at mobile network edge locations (e.g., typically at an eNodeB location).

Example embodiments include a method of integrating two network system components in a manner that has hitherto not been available. The first network system component is a satellite-based content delivery network (S-CDN) system that leverages the broadcast/multicast feature of satellites to enable an efficient delivery system to deliver popular and bandwidth-intensive applications such as linear video, video on demand (VOD) and large data files directly to mobile network edge locations. Such S-CDN system may provide an edge server located at the edge receiver site (i.e., typically at an eNodeB location) that is equipped with features such as local content insertion, caching, packaging, transcoding and streaming. The server is also equipped with appropriate interfaces to interface with the mobile network at the edge location.

The second network system component is a 4G/LTE mobile network that has been re-designed using virtual evolved packet core (vEPC) technology. The virtualization of EPC functions allows for the geographical separation of individual functions, which hitherto in a related art appliance-based EPC, had been located together in a centralized location. In this new approach a virtualized version of the Serving Gateway (S-GW) of an EPC is generated and the virtualized version of the S-GW is moved from a centralized mobile network operator (MNO) hub location to the edge location, for example, an eNodeB (typically a cell tower or small cell location) location, or to another location, that is located closer to the edge of a mobile network. In this specification, the virtualized version of the S-GW is called a local serving gateway (LS-GW). In one or more example embodiments, a duplicative/virtualized version of the Packet Data Network (PDN) Gateway (P-GW) is also generated at the edge location. In this specification, the virtualized version of the PDN Gateway is called a local PDN gateway (LP-GW). The LP-GW serves as an interface point to the S-CDN system.

The resulting integrated hybrid content delivery system supports the delivery of content to 4G/LTE mobile network edge locations via an alternative point-to-multipoint satellite link, in addition to delivery of content in unicast over the conventional terrestrial network or over satellite-based mobile backhaul networks in which content is originated form a content provider and transmitted terrestrially or via satellite to the MNO hub location and then unicast to eNodeBs and ultimately to end users/subscribers. The resulting integrated hybrid content delivery system is equipped with an intelligent request routing system through which content requests from UEs are selectively routed to the LP-GW interface for content that is cached locally and/or being delivered over the S-CDN that is integrated into the edge locations, or routed to the CP-GW at the centralized MNO hub location for all other content.

The example embodiments provide several advantages over related art architectures, including but not limited to reduction in burden on the Mobile Operator's backhaul connections, helping to save on hardware expenses and to improve overall service quality, and delivering content to edge locations more reliably and at a higher resolution enabling Mobile Operators and Content Providers to offer higher quality of services to end users and improved end-user experience levels.

FIG. 1 shows a related art Evolved Packet System (EPS) architecture for a 4G/LTE network. The EPS architecture 10 is simplified and shows only the main network elements for conciseness of description. The User Equipment (UE) 20 is a device used by an end user in the network. The UE 20 may include different end-user devices, such a mobile phone 21, a tablet 22, a laptop, etc. The UE 20 connects to a radio access network (RAN) 30. The RAN 30 includes an eNodeB 31 and connects the UE 20 to a core network of an MNO hub 40 and is responsible for the wireless interface with the UE 20. The MNO hub 40 implements an evolved packet core (EPC) 41. In a related art model, each of the EPC functions (i.e., mobile management entity (MME), home subscriber server (HSS), serving gateway (S-GW) and PDN gateway (P-GW)), as well as the eNodeB functions are typically appliance-based, meaning that each function is represented by a unique instance of hardware. The EPC 41 is connected to external Packet Data Networks (PDNs) which provide access to the Internet 50 and to other IP networks to the UE. The EPC 41 is typically located in a central MNO hub location on the Mobile Network and serves a multiplicity of eNodeBs. In a typical implementation, a plurality of MNO hubs 40 are provided, and each MNO hub 40 is connected to a plurality of RANs 30, which in turn connect to a plurality of UEs 20. However, for ease of description, only one MNO hub 40, one RAN 30 and one eNodeB 31 are shown in FIG. 1.

The EPC 41 includes a Mobility Management Entity (MME) 42, a Home Subscriber Server (HSS) 43, a Serving Gateway (S-GW) 44 and PDN Gateway (P-GW) 45.

The HSS 43 is the master database for the UEs 20. HSS 43 maintains subscription information for each user of the UEs 20, including identification parameters, security information for authentication, ciphering and integrity, user location data, and user profile information. Other network elements provide services to the UE 20 by querying the HSS 43 for the UE 20 information related to various services.

The MME 42 is a control plane element responsible for management of users of the UEs 20. The functions of the MME 42 include authentication, managing user session states, paging, mobility and evolved packet system (EPS) bearer state management for each UE 20 connected to the EPC 41.

The S-GW 44 is a data/user plane element that serves a UE 20 by routing IP data packets to and from the UE 20. The S-GW 44 also acts as the anchor point for UE handovers between eNodeBs 31 and also between non-3GPP last mile networks.

The P-GW 45 is a data/user plane element that routes incoming and outgoing IP packets from external data networks. Together, the P-GW and S-GW enable data packets to be transferred between the UE and external IP networks. The P-GW is also responsible for UE IP address allocation, policy enforcement and packet filtering.

To provide data services to the UE 20, EPS networks employ the concept of EPS bearers. An EPS bearer represents a logical connection between the UE 20 and the EPC 41. The EPS bearer comprises a plurality of tunnels between different network elements, over which data packets are delivered using the IP protocol. IP packets are sent over the radio interface between the UE 20 and eNodeB 31, between the eNodeB 31 and S-GW 44 and then between the S-GW 44 and P-GW 45. An EPS bearer uniquely identifies traffic flows between a UE 20 and P-GW 45 and is configured in accordance with an assigned common Quality of Service (QoS) control.

When the UE 20 establishes a connection with the EPC 41 to request data services, a secured connection is built all the way from the requesting UE 20 to the S-GW 44 of the EPC 41 at the central MNO hub location.

The tunneling approach has a limitation in that there is no way to locally analyze the UE requests and ingest traffic, for example, from a satellite, at the eNodeB location.

Because of this limitation, all content requests from UEs 20 on 4G/LTE networks are serviced in unicast mode from the EPC 41 located at the central MNO hub 40 location. This means that every UE request is individually served by the central MNO hub 40 even if multiple UEs are requesting the same popular content. This puts a significant burden and congestion on the MNO's backhaul network—with the only resolution being for the MNO to undertake frequent and costly upgrades to its backhaul bandwidth, and/or for the MNO's end users to experience service degradation.

While MNOs and content delivery networks (CDNs) have deployed related art CDN technology on mobile networks, the CDN reach typically stops at the entry point to the EPC 41. In other words, the CDNs are provided from the content source to the EPC 41 at the central MNO hub 40, which is the starting point of the tunnel to the UE. The only technology options for providing content delivery closer to the edge of the mobile network has been to pre-cache content directly on end-user devices, or to use peering technology which effectively forces end-user devices to share content residing on their devices with other user devices on or near the last mile local network—both approaches are suboptimal as each requires the consent and cooperation of end-users and actual levels of improvement of performance can be scattered.

Example embodiments integrate network function virtualization (NFV), CDN and Satellite technologies to develop a new approach that allows ingestion of content delivered over a satellite overlay system at the edge location.

Figure 2:
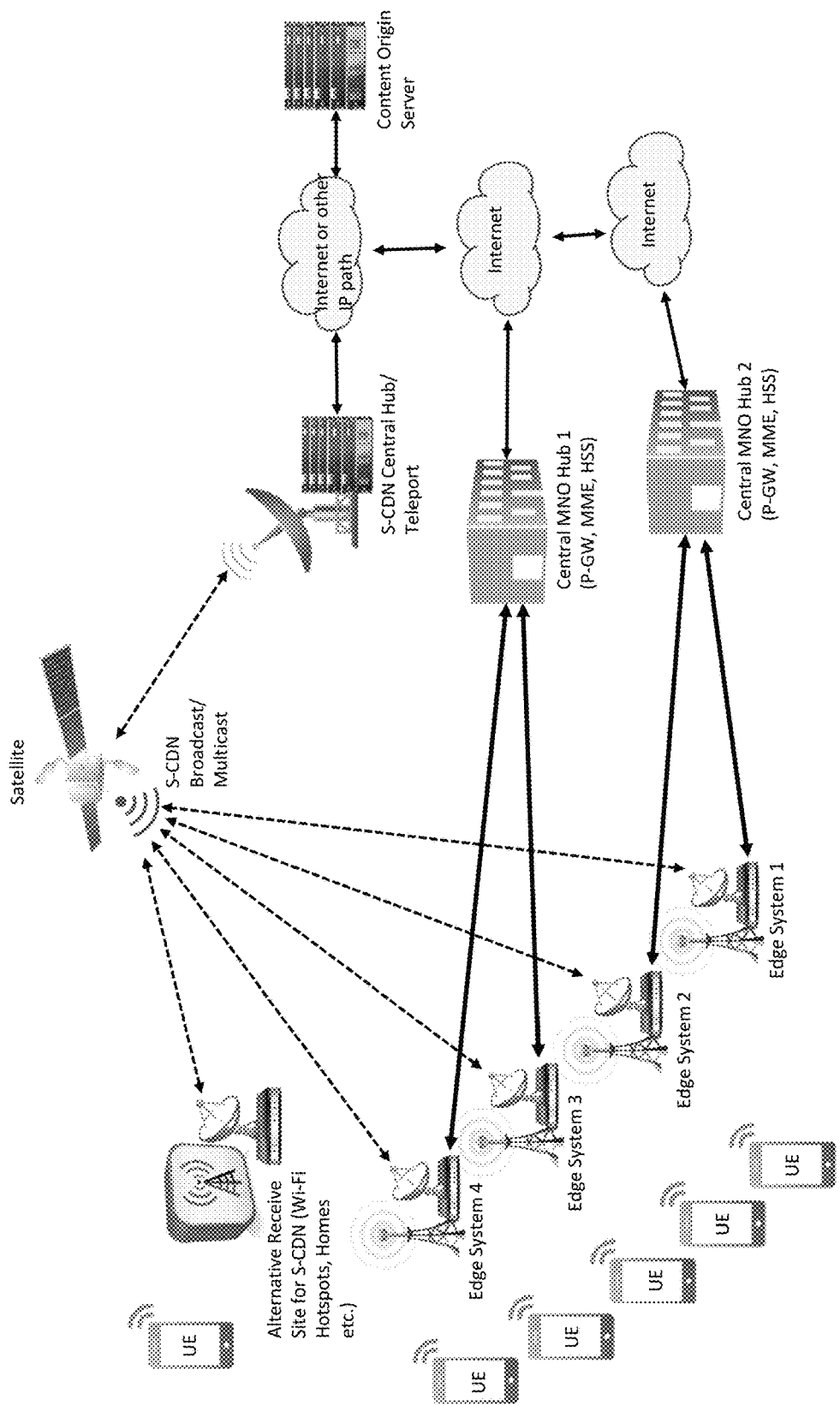
FIG. 2 is a system overview of an integrated hybrid content delivery system according to example embodiments.

FIG. 2 illustrates a system overview of an integrated hybrid content delivery system according to example embodiments.

As illustrated in FIG. 2, a content origin site, such as a content original server, provides content through the Internet or other IP path to an S-CDN central hub. As used herein, the term "Internet" is not particularly limited and may include any IP paths. In some embodiments, the S-CDN central hub may be a teleport site. The S-CDN central hub uplinks content from the content origin server over Satellite using S-CDN broadcast or multicast, to various receive sites. For example, in related art S-CDN, the S-CDN central hub may uplink content to the Satellite for downlink to a receive site for S-CDN such as a WiFi hotspot, a home satellite dish, etc., where the content is downlinked, unpacked, unencrypted and provided for delivery directly to a television or other user equipment (UE) on the WiFi hotspot or in the home, etc. In FIG. 2, such receive site is presented as an alternative receive site in this specification to distinguish the receive site from edge locations as described below. Unlike edge locations, the alternative receive site does not require breaking into a tunnel to insert content and thus does not raise the issues and limitations described above.

The content origin server may also provide content through the Internet to various central MNO hubs (e.g., Central MNO Hub 1, Central MNO Hub 2, etc.) for delivery over conventional terrestrial networks to edge systems (e.g., Edge System 1, Edge System 2, Edge System 3, Edge System 4) for unicast to various UEs. In the integrated hybrid content delivery system according to example embodiments, the S-CDN central hub may also uplink content over Satellite to downlink to each of the edge systems directly for distribution to the various UEs. In this way, satellite content is ingested closer to the edge of the mobile network than the central MNO hub location. In a typical implementation, a plurality of central MNO hubs are provided, each serving one or more edge systems, and each edge system serving a plurality of UEs.

As used in this specification, the terms "edge" and "edge location" are used to distinguish from the central or regional MNO hub aggregation location. An edge location is a location that is closer to the user terminal/subscriber than the central MNO hub location, and may be, for example, at a base station, at an eNodeB location, or at any other mobile network location as long as the location is closer to the user/subscriber than the central MNO hub location. Thus, the terms "edge" and "edge location" also include a mobile network gateway location where there is telecommunication infrastructure that interconnects the mobile network gateway to plural eNodeBs, as long as the gateway location is closer to the user/subscriber than the central MNO hub location.

Figure 3:
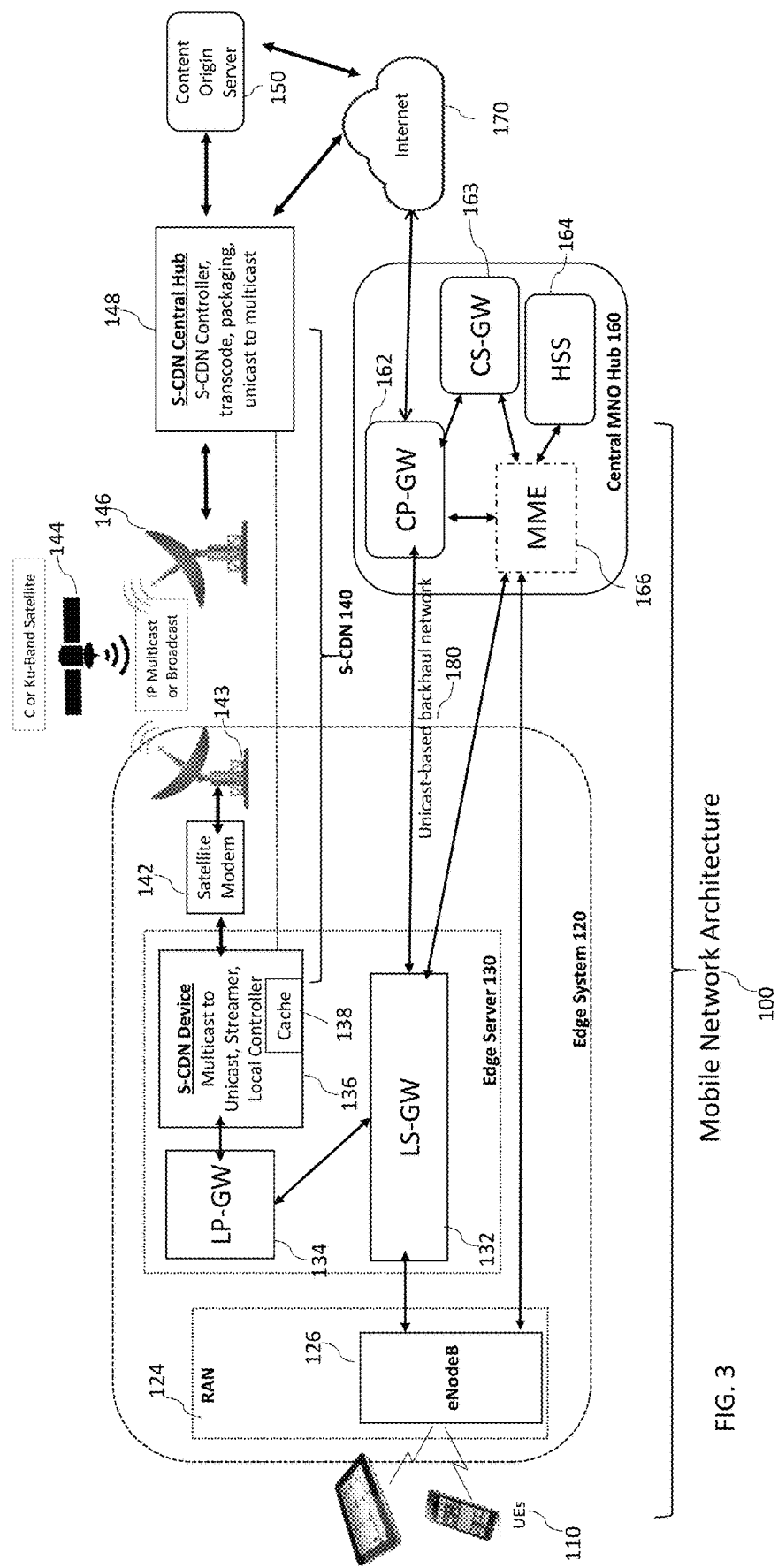
FIG. 3 is an example of a mobile network architecture according to example embodiments.

FIG. 3 shows an example of a mobile network architecture according to example embodiments. As shown in FIG. 3, a mobile network architecture 100 comprises one or more user equipment (UEs) 110, one or more edge systems 120, a satellite-based content delivery network (S-CDN) 140, and a central MNO hub 160. In a typical implementation, a plurality of central MNO hubs 160 are provided, and each central MNO hub 160 is connected to a plurality of edge systems 120, which in turn each connect to a plurality of UEs 110. However, for ease of description, only one central MNO hub 160 and one edge system 120 are shown in FIG. 3.

The UEs 110 are mobile devices used by end users in the mobile network. The UEs 110 may include different end-user devices, such a mobile phone 21, a tablet 22, a laptop, etc. However, this is not particularly limited, and the UEs 110 may be any mobile device provided with a wireless connection for connecting wirelessly to the mobile network.

The edge system 120 includes a radio access network (RAN) 124, an edge server 130, a satellite modem 142, and a satellite antenna 143.

The RAN 124 is hardware, typically provided by the mobile network operator, that allows UEs to wirelessly access the mobile network. The RAN 124 may be of various types, including GSM, UTRAN, E-UTRAN, etc., or some combination of types. The RAN 124 may accordingly include a plurality of different antennas for wirelessly communicating with the UEs 110 according to the radio access network type(s). The RAN 124 may include an eNodeB 126.

The eNodeB 126 comprises hardware that communicates wirelessly directly with the UEs 110 through the antenna hardware of the RAN 124.

In some embodiments, the RAN 124 and associated eNodeB 126, typically called a radio base station, may be provided by the Mobile Network Operator, and the edge server 130 may be installed as separate hardware at the location of the RAN 124 and associated eNodeB 126 and connected to the RAN 124 and associated eNodeB 126 by a local interconnection. In some embodiments, the edge server 130 may be installed as separate hardware at an edge location and may serve a plurality of eNodeBs. In other embodiments, the edge server 130 may be implemented directly on the hardware implementing the eNodeB 126. In other words, the edge server 130 and its associated functionality may be installed on the existing hardware that implements the eNodeB 126 in some embodiments.

The edge server 130 includes a local serving gateway LS-GW 132, a local Packet Data Network (PDN) Gateway LP-GW 134, and a virtualized S-CDN edge device (S-CDN Device) 136. The edge server 130 includes one or more microprocessors and one or more memories that store program code which, when executed by the one or more microprocessors, implements the functionality of the LS-GW 132, the LP-GW 134 and the S-CDN Device 136.

The LS-GW 132 is a virtualized implementation of the S-GW of the EPC. The LS-GW 132 routes and forwards data packets, stores various contexts for the UEs 110 and manages internal network routing information. By providing the LS-GW 132 and the LP-GW 134 at the edge system 120, it becomes possible to ingest content into the Mobile Network locally at the same location as the eNodeB 126.

The LP-GW 134 is a virtualized implementation of the P-GW of the EPC. The LP-GW 134 connects the UE to external packet data networks, and performs packet handling services for interfacing with the various external packet data networks.

The S-CDN Device 136 is the local interface to the S-CDN 140, and converts downlink transmissions from the Satellite 144 from multicast to unicast, includes a local streamer to stream data transmissions, and serves as the local controller portion of the S-CDN 140. The S-CDN Device 136 may include at least one cache 138. The S-CDN Device 136 is connected to the satellite modem 142, and the satellite modem 142 is connected to a satellite antenna 143. The satellite modem 142 and the satellite antenna 143 are also part of the S-CDN 140.

The LS-GW 132 and LP-GW 134 components as well as the S-CDN Device 136 may be instantiated on common multi-tenant architecture (such as OpenStack) at the edge system 120 location. The edge system 120 uses virtualization techniques using software running on one or more processor in conjunction with one or more memories to allow for management of specific components to be owned/conducted by different entities.

The LP-GW 134 connects to the cache 138 within the S-CDN Device 136 that in turn is connected to the satellite modem 142 of the satellite downlink. The S-CDN Device 136 in some example embodiments provides for streaming of content delivered via the satellite link.

In operation, the S-CDN Device 136 receives downlink transmissions of packet data from the satellite modem 142 that have been received from Satellite 144, and selectively stores the received packet data in the at least one cache 138. The S-CDN Device 136 provides the packet data to the LP-GW 134. The LP-GW 134 performs packet handling services related to the packet data, such a packet filtering and screening, and provides the resulting packets to the LS-GW 132 for routing to the UEs 110.

The S-CDN Device 136 may host a software instance of a Request Routing system to advertise the cache content (e.g., URLs URIs, etc.) to resolve to a server IP address enabling requests from UEs 110 for content that is cached in the cache 138 of the S-CDN Device 136 to be directed via the LS-GW 132 to the LP-GW 134 and to the cache 138 of the S-CDN Device 136. As a result of this process, the requested content is delivered from the cache 138 of the S-CDN Device 136 to the LP-GW 134 and then to the LS-GW 132, from the LS-GW 132 to the eNodeB 126, and through the eNodeB 126 to the UEs 110 over the RAN 124.

The satellite modem 142 establishes data communication with the Satellite 144 through one or more satellite antennas 143 connected to the satellite modem 142.

The satellite antenna 143 may be a Very Small Aperture Terminal (VSAT) or a Television Receive-Only (TVRO) satellite antenna. The satellite antenna 143 is installed at the edge system 120 and transmits and receives content and associated control information over satellite 144 to/from a satellite antenna 146 connected to a S-CDN Central Hub 148 which is connected to a content origin server 150. In operation, the satellite antenna 143 and the satellite modem 142 are installed at the edge system 120 to receive the S-CDN signal from the satellite 144. The output of the satellite modem 142 connects to the S-CDN Device 136 which, among other things, conducts multicast to unicast conversion and caching.

The Central MNO hub 160 includes a central packet data network gateway (CP-GW) 162, an HSS 164 and an MME 166. The CP-GW 162 remains at the central MNO hub 160 location to support interfaces to the Internet 170 and other external IP networks.

It should be noted that in some example embodiments, the MME 166 may be located at the edge system 120. Additionally, it should be noted that, while related art connectivity for unicast backhaul traffic from the edge system location to the central MNO hub location typically uses terrestrial networks, the backhaul connectivity may occasionally use satellite links.

The satellite content delivery network (S-CDN) 140 includes the S-CDN Device 136 of the edge server 130 of the edge system 120, the satellite modem 142, the satellite antennas 143, 146, the Satellite 144, and the S-CDN Central Hub 148. The entry point for all content to be delivered over the S-CDN 140 is the content origin server 150 which may be located either at a teleport or in a virtual location in an Internet cloud. That is, the S-CDN 140 includes the communication path from the content origin server 150 to the edge system 120 located at the edge of the mobile network as shown in FIG. 3. While FIG. 3 shows only one satellite 144, this is only an example, and multiple satellites may be provided and in communication with each other between the satellite antennas 143, 146. In other words, the satellite 144 may include plural satellites in, for example, a space-based satellite network. The content may be one or more of a variety of video or data delivery formats and applications including, for example, linear video, video on demand, and file transfer, etc. The content is routed to a satellite antenna 146, uplinked and transported over a multicast or broadcast connection over satellite 144 and downlinked at the satellite antenna 143. Thus, with the S-CDN 140, the same content may be delivered simultaneously to a multiplicity of edge system 120 locations which are within the coverage of the satellite downlink beam (see, e.g., FIG. 2) and which are equipped with a satellite antenna (either a VSAT or TVRO system) and a receive terminal. It should be noted that only one edge system 120 is shown in FIG. 3 for conciseness and simplicity of description.

At a given edge system 120 location, the content delivered over the S-CDN 140 is temporarily stored in the cache 138 within the S-CDN Device 136 and made available to be delivered from the cache 138 over the eNodeB 126/RAN 124 in response to requests from UEs 110 operating within the communication range of the eNodeB 126/RAN 124. This communication range is sometimes denoted "the last mile" from the eNodeB 126/RAN 124 to the UEs 110 that are associated with the eNodeB 126/RAN 124.

The virtualized instances of the S-GW and the P-GW, i.e., the LS-GW 136 and the LP-GW 134, create a new interface between the S-CDN 140 and the Mobile Network at the edge system 120 location, which allows content from the cache 138 of the S-CDN Device 136 to be ingested into the Mobile Network via the LP-GW 134.

The CP-GW 162 at the Central MNO Hub 160 location of the Mobile Network remains in place and is connected to the LS-GW 134 of the edge system 120 located at the edge of the mobile network to service requests from UEs 110 for content that is not available on the cache 138 of the edge system 120. In some embodiments, the MME 166 may be located centrally at the Central MNO hub 160 location, as shown in FIG. 3. As discussed above, in other embodiments, the MME 166 may be located locally at the edge system 120.

As compared with the related art, in example embodiments, the LS-GW 132 is relocated from the central/core EPC location and distributed to a multiplicity of edge system 120 locations, and S-GW instances (which in the related art are limited to hardware on the centralized MNO hub) are now established at each edge system 120 location as an LS-GW 132. Each LS-GW 132 located in an edge system 120 location is connected to two instances of P-GW, a first instance being the LP-GW 134 which provides access to content on the cache 138 of the S-CDN Device 136, and a second instance being the CP-GW 162 which operates in central MNO hub 160 at the central hub EPC location and continues to provide interface to the Internet 170 and other IP networks for terrestrial unicast-based delivery of content requested by the UEs 110 that is not available on the cache 138 of the S-CDN Device 136.

According to the example embodiments, CDN request routing techniques for route optimization are used to enable automatic determination as to whether content requested by any given UE 110 is available to be delivered via the LP-GW 134 from the local cache 138 of the S-CDN Device 136 of the edge system 120, or whether the content should be requested and delivered via the CP-GW 162 using related art terrestrial unicast techniques.

This solution creates a highly efficient network solution that will offload popular, bandwidth-consuming content from the Mobile Network Operator (MNO)'s core unicast-based backhaul network 180, and deliver such content instead over an optimized multicast/satellite-based content delivery system (i.e., the S-CDN 140). As a result MNOs will be able to support a higher volume of UE content requests than what the MNO's terrestrial-based backhaul networks can manage and what the MNOs can do so without requiring access to or involvement of UEs.

The solution also improves the Quality of Experience (QoE) for end-users by making such popular high-bandwidth/resolution content available at the edge system 120 location on a distributed basis, thus improving key performance indicators such as average throughput, latency and buffering. For example, UE viewers of popular live sports and other major events will be able to receive their video at a higher average resolution with reduced latency and minimal screen freezing and outages compared to instances where UE viewers receive all their content over the related art terrestrial-based unicast-based mobile backhaul network—in which the UEs are competing for bandwidth with all other concurrent UEs of the same Mobile Network that are requesting either the same or different content.

Figure 4:
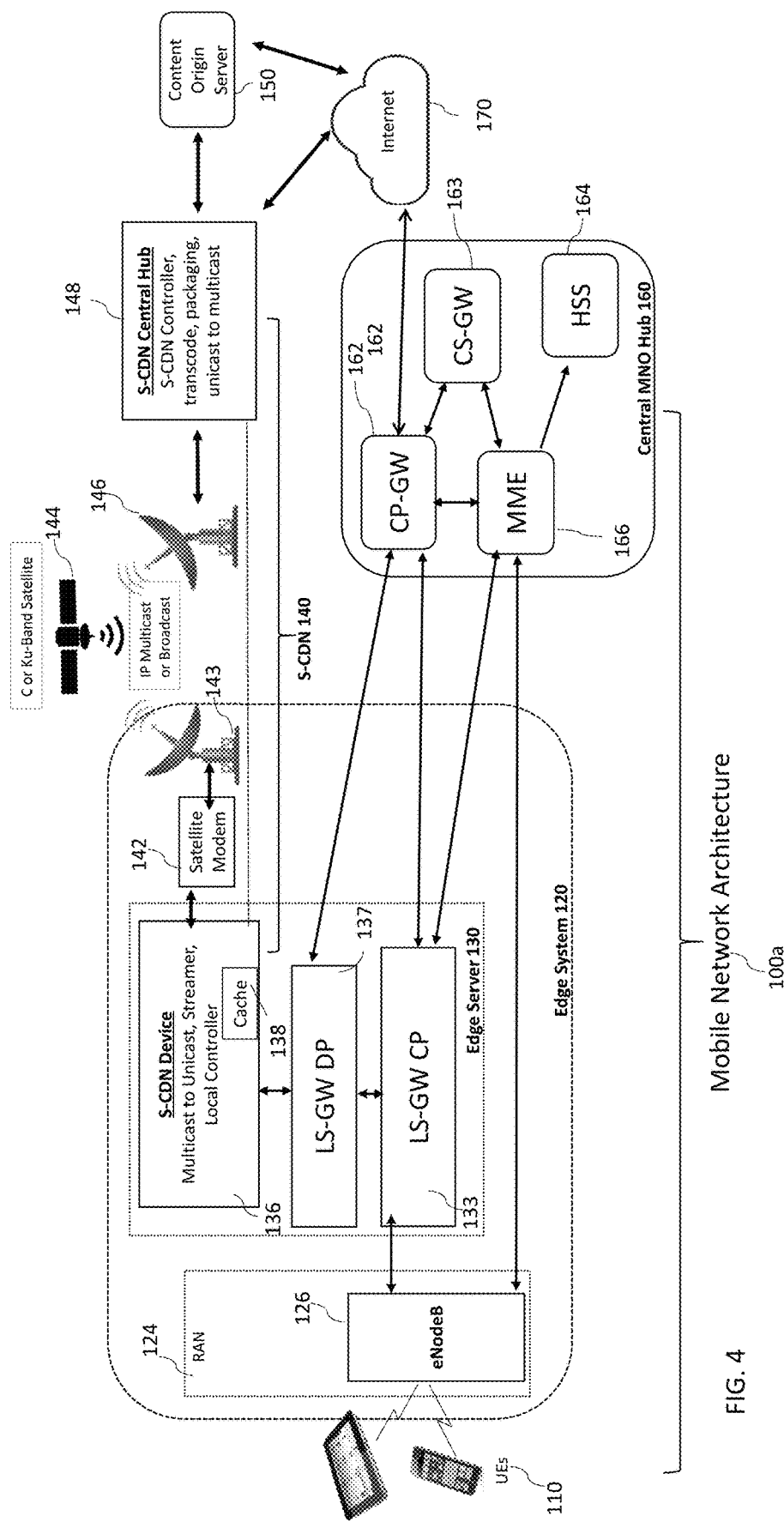
FIG. 4 is another example of a mobile network architecture according to example embodiments.

FIG. 4 is another example of a mobile network architecture according to example embodiments. The example embodiment shown in FIG. 4 is similar to the example embodiment shown in FIG. 3, except for the configuration of the edge server 130 of the edge system 120. Accordingly, the description that follows focuses on the differences in the configuration of the edge server 130, and repeated description of the remaining components is omitted for conciseness.

As shown in FIG. 4, a mobile network architecture 100a includes one or more user equipment (UEs) 110, one or more edge systems 120, a satellite-based content data network (S-CDN) 140, and a central MNO hub 160. The edge system 120 includes the edge server 130.

The edge server 130 comprises a local serving gateway control plane (LS-GW CP) 133, a local serving gateway data plane (LS-GW DP) 137 and the S-CDN Device 136. The edge server 130 includes one or more microprocessors and one or more memories that store program code which, when executed by the one or more microprocessors, implements the functionality of the LS-GW CP 133, the LS-GW DP 137, and the S-CDN Device 136.

Additionally, as shown in FIG. 4, the Central MNO hub 160 location is further provided with an CS-GW 163.

In the edge server 130 shown in FIG. 4, local breakout technology that is typically used to facilitate efficient roaming is used to allow the LS-GW to emulate part of the LP-GW function of the example embodiment shown in FIG. 3 to enable ingesting content from the S-CDN 140 without the LP-GW 134. In other words, the LS-GW data plane (LS-GW effectively serving the function of both the LS-GW and the LP-GW in the embodiment of FIG. 3) is locally broken out at the edge location. The LS-GW CP 133 also resides at the edge location.

Figure 5:
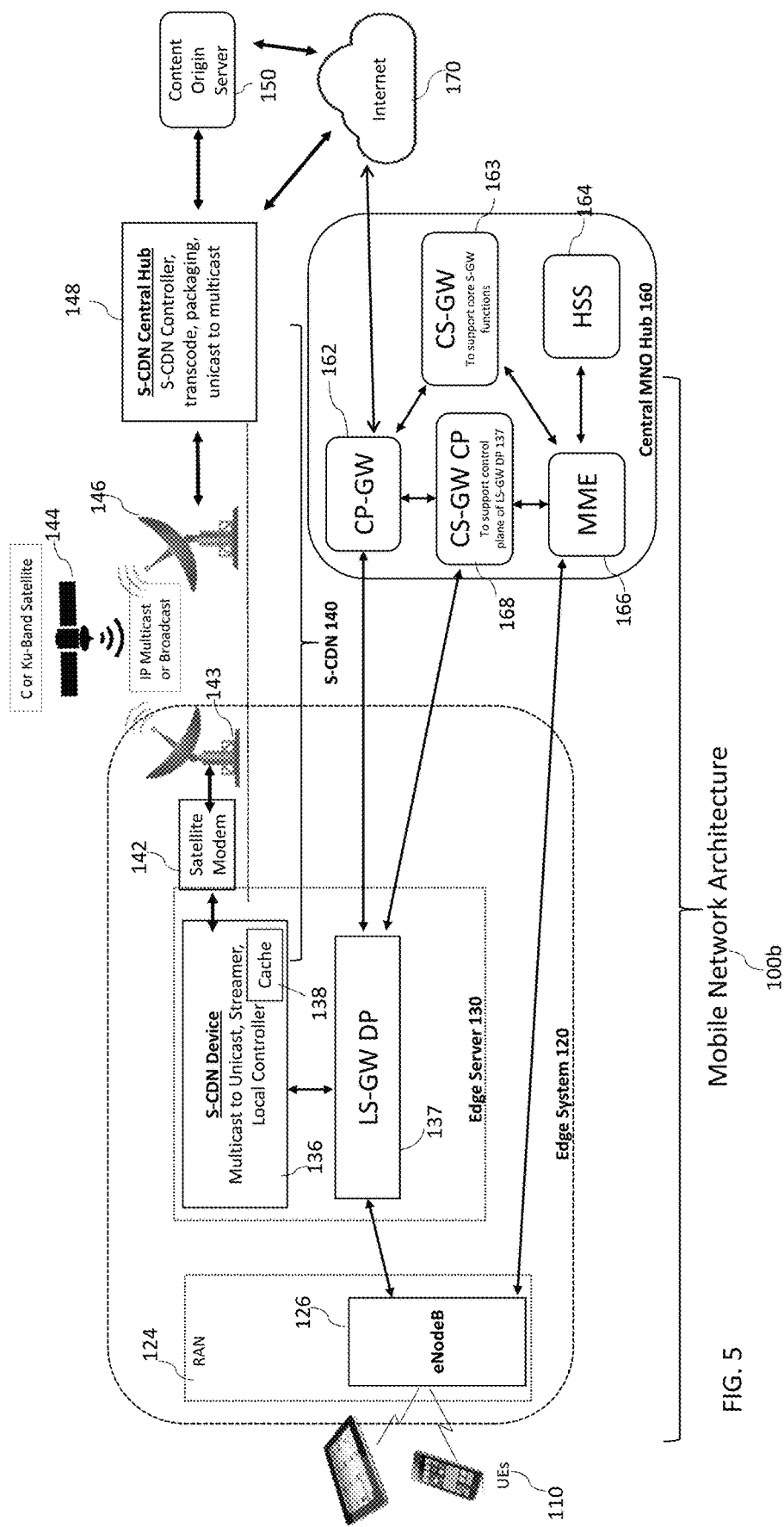
FIG. 5 is yet another example of a mobile network architecture according to example embodiments.

FIG. 5 is yet another example of a mobile network architecture according to example embodiments. The example embodiment shown in FIG. 5 is similar to the example embodiments shown in FIGS. 3 and 4, except for the configuration of the edge server 130 of the edge system 120. Accordingly, the description that follows focuses on the differences in the configuration of the edge server 130, and repeated description of the remaining components is omitted for conciseness.

As shown in FIG. 5, a mobile network architecture 100b includes one or more user equipment (UEs) 110, one or more edge systems 120, a satellite-based content data network (S-CDN) 140, a central MNO hub 160. The edge system 120 includes the edge server 130.

The edge server 130 comprises the local serving gateway data plane (LS-GW DP 137) and the S-CDN Device 136. The edge server 130 includes one or more microprocessors and one or more memories that store program code which, when executed by the one or more microprocessors, implements the functionality of the LS-GW DP 137 and the S-CDN Device 136.

Additionally, as shown in FIG. 5, the Central MNO hub 160 location is further provided with an CS-GW DP 165 and an CS-GW CP 168.

In the edge server 130 shown in FIG. 5, the control plane and data plane are separated, as in the case of FIG. 4, between those that support control plane traffic and those that support data (user) plane traffic. Because the primary goal of relocating the S-GW to the edge location is to enable the ingest of content from the S-CDN 140 at the edge into the data plane, the control plane and data plane separation make it possible to relocate only the data plane portion, i.e., LS-GW DP 137, of the S-GW to the edge location and retain the control plane portion, i.e., CS-GW CP 168, of the S-GW in the central MNO Hub 160 location. The benefit of the embodiment shown in FIG. 5 is that control data can stay in the central location for improved security/control on the part of the MNO.

Figure 6:
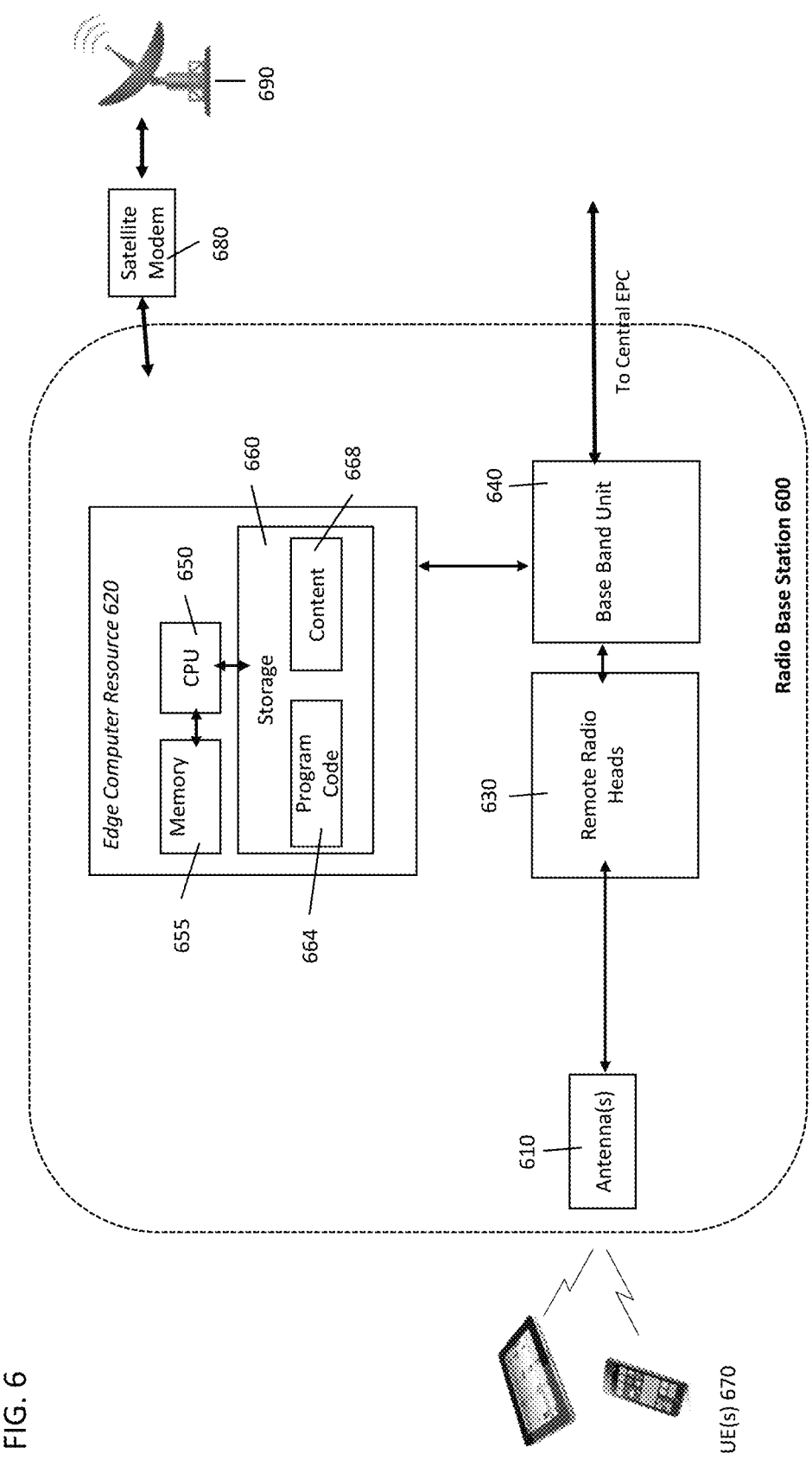
FIG. 6 is an example of a configuration of a base station according to various example embodiments.

FIG. 6 is an example of a radio base station configuration according to various example embodiments. As described above, the functionality of the edge server 130 may be implemented as an edge computer resource on hardware located at the eNodeB/RAN.

As shown in FIG. 6, a radio base station 600 may include one or more antennas 610, an edge computer resource 620, one or more remote radio heads 630, and a base band unit 640.

The one or more antennas 610 may include different antennas for wirelessly communicating with the UEs 670 according to various communication protocols and types.

The edge computer resource 620 may implement the functionality of the edge server 130 of FIG. 3, 4 or 5. The edge computer resource 620 includes one or more central processing units (CPUs) 650, one or more memories 655, and a storage 660. The storage 660 may store program code 664 and/or content 668. The program code 664 may be loaded by the one or more CPUs 650 into the one or more memories 655 and executed. The program code 664 may include specific code for implementing each of the LS-GW 132, the LP-GW 134, and the S-CDN Device 136 of the edge server 130 of FIG. 3; the LS-GW CP 133, the LS-GW CP 137 and the S-CDN Device 136 of the edge server 130 of FIG. 4; or the LS-GW DP 137 and the S-CDN Device 136 of the edge server 130 of FIG. 5. Accordingly, the program code 664, loaded into the one or more memories 655 and executed by the one or more CPUs 650 may implement the functions of the LS-GW 132, the LP-GW 134, and the S-CDN Device 136 of the edge server 130 of FIG. 3; the LS-GW CP 133, the LS-GW CP 137 and the S-CDN Device 136 of the edge server 130 of FIG. 4; or the LS-GW DP 137 and the S-CDN Device 136 of the edge server 130 of FIG. 5

The one or more remote radio heads 630 comprise radio frequency (RF) circuits, analog to digital converters and up and down converters to convert high frequency signals to base band signals.

The base band unit 640 includes one or more processors to process the base band signals. The base band unit 640 is connected to the edge computer resource 620, the Central EPC and the remote radio heads 630, which are in turn connected to the one or more antennas 610.

In operation, the edge computer resource 620 is connected through a satellite modem 680 to a satellite antenna 690 and ingests content from the S-CDN 140 as described above with respect to FIGS. 3-5 and outputs the content to the base band unit 640. The base band unit 640 provides the content to the remote radio heads 630 and then to the antenna(s) 610 for transmission to the UEs 670, and vice versa.

Figure 7:
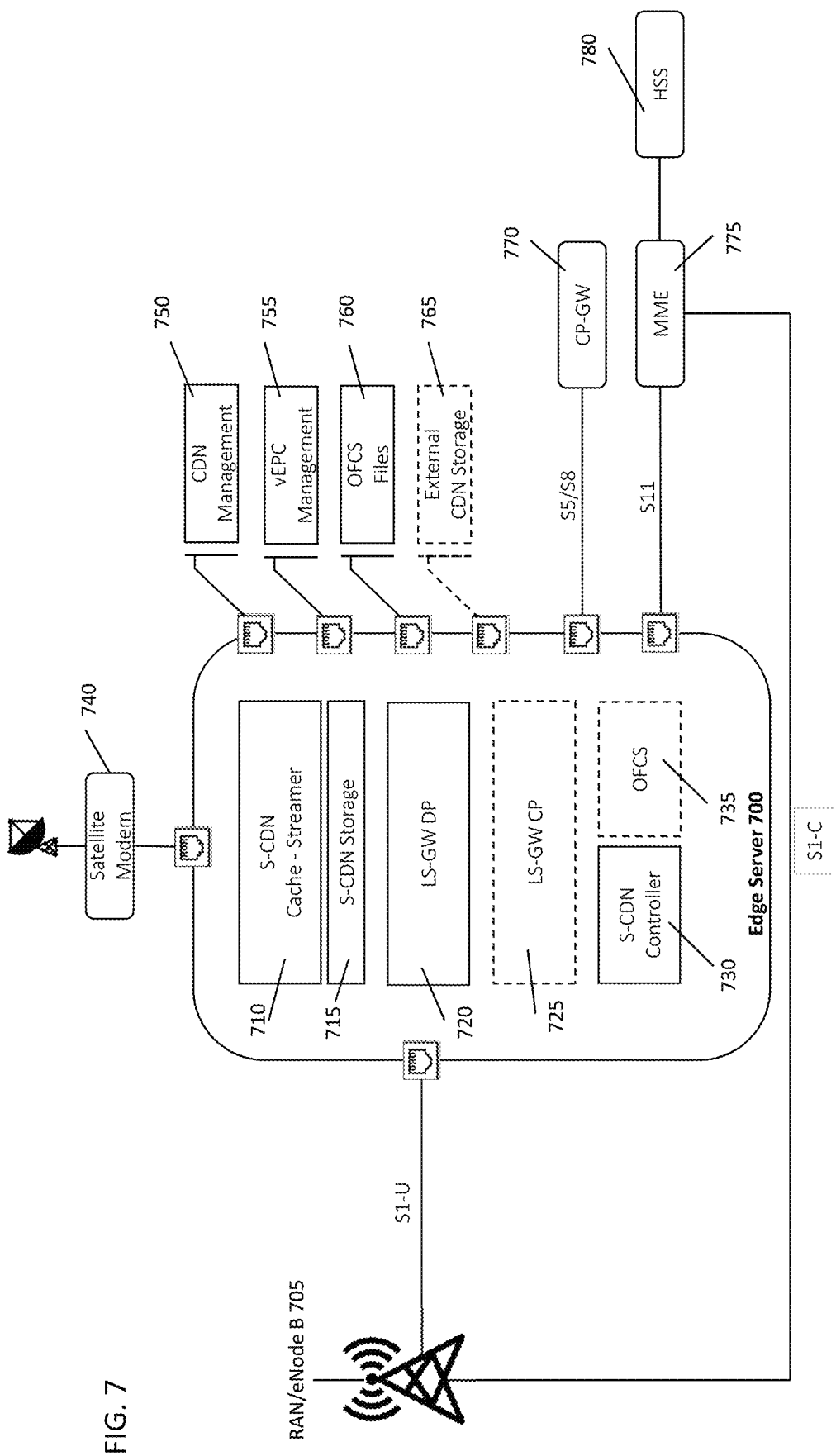
FIG. 7 is an example of a functional block diagram of virtual functions supported by an edge server, according to example embodiments.

FIG. 7 is an example of a functional block diagram of the virtual functions supported by an edge server, according to example embodiments. In some embodiments, the edge server 700 may correspond to the edge server 130 shown in FIG. 3, 4, or 5.

As shown in FIG. 7, an edge server 700 may include an S-CDN cache and streamer 710, an S-CDN storage 715, an LS-GW DP 720, and an S-CDN controller 730. In some embodiments, the edge server 700 may further include an LS-GW CP 725 and an offline charging system (OFCS) 735. The S-CDN cache and streamer 710 may correspond to the cache 138 and the streamer functionality of the S-CDN Device 136 of the embodiments of FIGS. 3-5. The S-CDN storage 715 may be connected to the S-CDN cache and streamer 710 and may provide, for example, storage for video on demand (VOD) media. As with the embodiments described above, the edge server 700 may include one or more processors in conjunction with one or more memories that together implement the functionality of the edge server 700 shown in FIG. 7.

The edge server 700 may be connected to a RAN/eNodeB 705 by an S1-U interface Ethernet connection, to a CP-GW 770 by an S5/S8 interface Ethernet connection, and to an MME 775 by an S11 interface Ethernet connection. The MME 775 may be connected to the RAN/eNodeB 705 by an S1-C interface Ethernet connection. Additionally, Ethernet connections may be provided from the edge server 700 to a CDN management 750, a vEPC management 755, OFCS files 760, and a satellite modem 740, respectively. In some embodiments, an Ethernet connection may also be provided for an external CDN storage 765.

The example embodiments of the edge system described above may support two types of content delivery models: a push model and a pull model.

The Push Model according to various example embodiments denotes a model where designated content is pre-populated on the cache of the edge system in advance of any UE request for such content.

The Pull Model according to various example embodiments denotes a model where a Request Routing system dynamically tracks content that has been requested multiple times by different UEs and signals to the S-CDN to deliver such content over the S-CDN to be stored on relevant caches of the edge systems.

Figure 8:
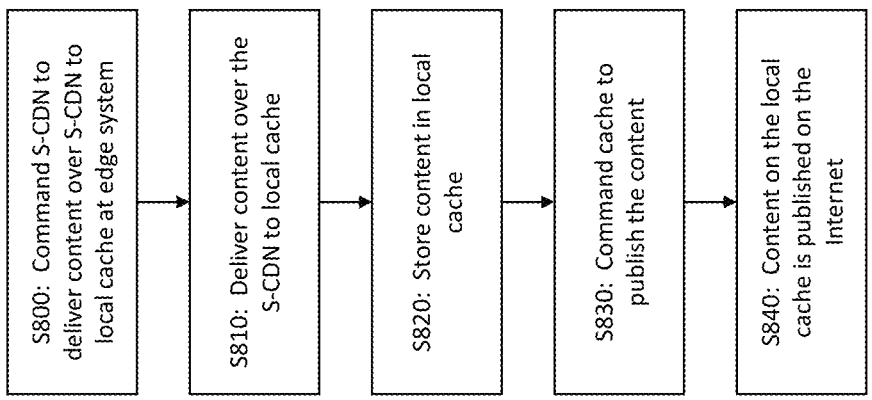
FIGS. 8-9 are flowcharts illustrating examples of a push method of content delivery using the mobile network architecture of FIG. 3, according to example embodiments.
Figure 9:
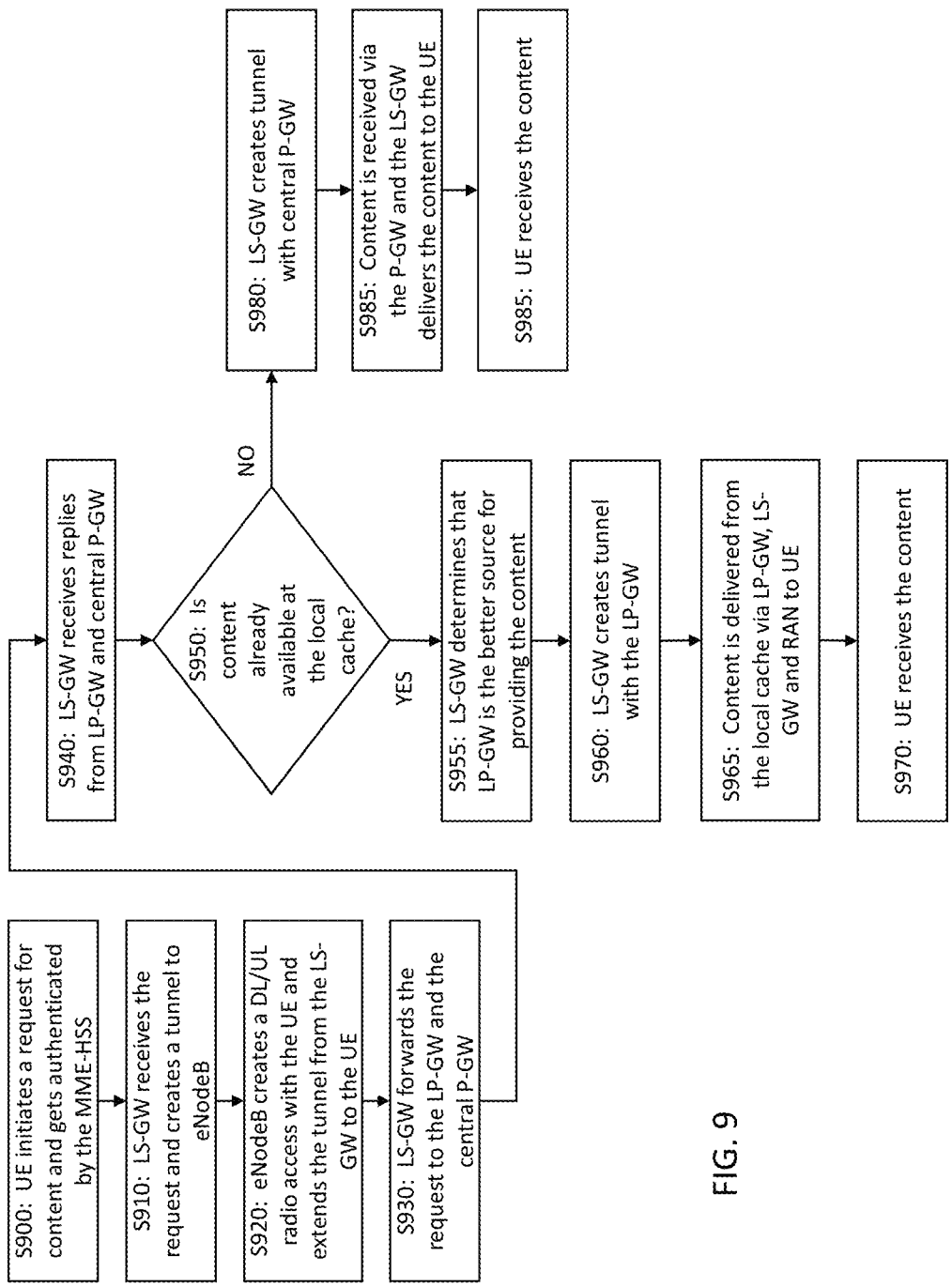

FIGS. 8-9 are flowcharts illustrating examples of a push method of content delivery using the mobile network architecture of FIG. 3, according to example embodiments. FIG. 8 illustrates an example of a first step in the push method, and FIG. 9 illustrates an example of a second step in the push method.

In operation S800, the S-CDN is commanded to deliver content over the S-CDN to a local cache at an edge system location. For example, the MNO may command the S-CDN 140 to deliver specified content over the S-CDN 140 to local caches 138, 710, 715 at identified edge system 120 locations.

In operation S810, the content is delivered over the S-CDN to the local cache at the edge system. For example, the content may be delivered over the S-CDN 140 to cache(s) 138, 710, 715 of the edge system 120 at the edge location.

In operation S820, the content is stored in the local cache. For example, the content may be stored in the cache(s) 138, 710, 715 under control of the S-CDN Device 136.

In operation S830, the local cache is commanded to publish the content. For example, the cache(s) 138, 710, 715 may publish the content to UEs 110 associated with the edge system 120 location.

In operation S840, the content on the local cache is published on the Internet.

Turning to FIG. 9, in operation S900, a UE may initiate a request for content and get authenticated by the MME-HSS. For example, a UE 110 may initiate a request for specified content and get authenticated by the MME 166 and HSS 164 of the central MNO Hub 160.

In operation S910, the LS-GW receives the request and creates a tunnel to the eNodeB. For example, the LS-GW 132 may receive the request and create a tunnel from the LS-GW 132 to the eNodeB 126.

In operation S920, the eNodeB may create a download (DL)/upload (UL) radio access with the UE and extend the tunnel from the LS-GW to the UE. For example, the eNodeB 126 may create the DL/UL radio access with the UE 110 and extend the tunnel from the LS-GW 132 to the UE 110.

In operation S930, the LS-GW forwards the request to the LP-GW and the central P-GW. For example, the LS-GW 132 may forward the request from the UE 110 to the LP-GW 134 at the edge system 120 location and to the CP-GW 162 at the central MNO Hub 160 location.

In operation S940, the LS-GW may receive replies from the LP-GW and the central P-GW. For example, the LS-GW 132 may receive replies to the request from the LP-GW 134 at the edge system 120 location and to the CP-GW 162 at the central MNO Hub 160 location.

In operation S950, it is determined whether the content is already available at the local cache. For example, the LS-GW 132 determines whether the content that is requested by the UE 110 is already available in the cache 138, 710, 715 of the edge system 120 that is serving the UE 110.

If the content is determined to be already available at the local cache (operation S950, YES), the LS-GW determines that the LP-GW is the better source for providing the content. For example, the LS-GW 132 may determine that the LP-GW 134 of the edge system 120 that is serving the UE 110 is the better source for providing the content.

In operation S960, the LS-GW creates a tunnel with the LP-GW. For example, the LS-GW 132 may create the tunnel with the LP-GW 134 of the edge system 120 that is serving the UE 110.

In operation S965, the content is delivered from the local cache via the LP-GW, the LS-GW and the RAN to the UE, and in operation S970, the UE receives the content. For example, the content is delivered from the cache 138, 710, 715 of the edge system 120 via the LP-GW 134, the LS-GW 132, and the eNodeB 126 of the RAN 124 to the UE 110.

On the other hand, if it is determined that the content is not already available at the local cache (operation S950, NO), the LS-GW creates a tunnel with the central P-GW in operation S980. For example, the LS-GW 132 may create the tunnel with the CP-GW 162 of the central MNO hub 160 location.

In operation S985, the content is received via the central P-GW and the LS-GW delivers the content to the UE, and in operation S985, the UE receives the content. For example, the LS-GW 132 may receive the content through the tunnel with the CP-GW 162 and deliver the content to the UE 110. The content may be delivered to the UE 110 through the CP-GW 162, the LS-GW 132, the eNodeB 126 of the RAN 124 to the UE 110.

Figure 10:
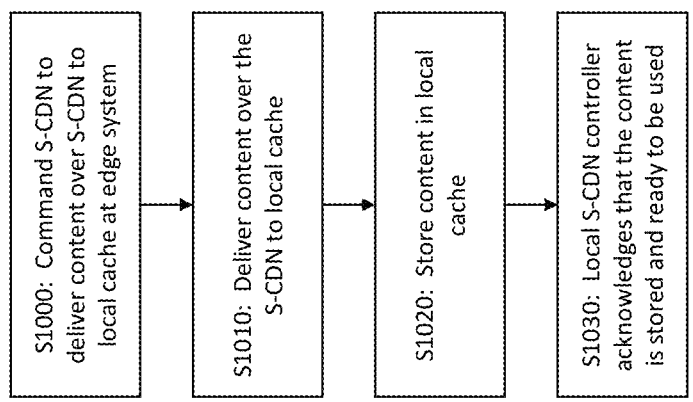
FIGS. 10-11 are flowcharts illustrating examples of a push method of content delivery using the mobile network architecture of FIG. 4 or 5, according to example embodiments.
Figure 11:
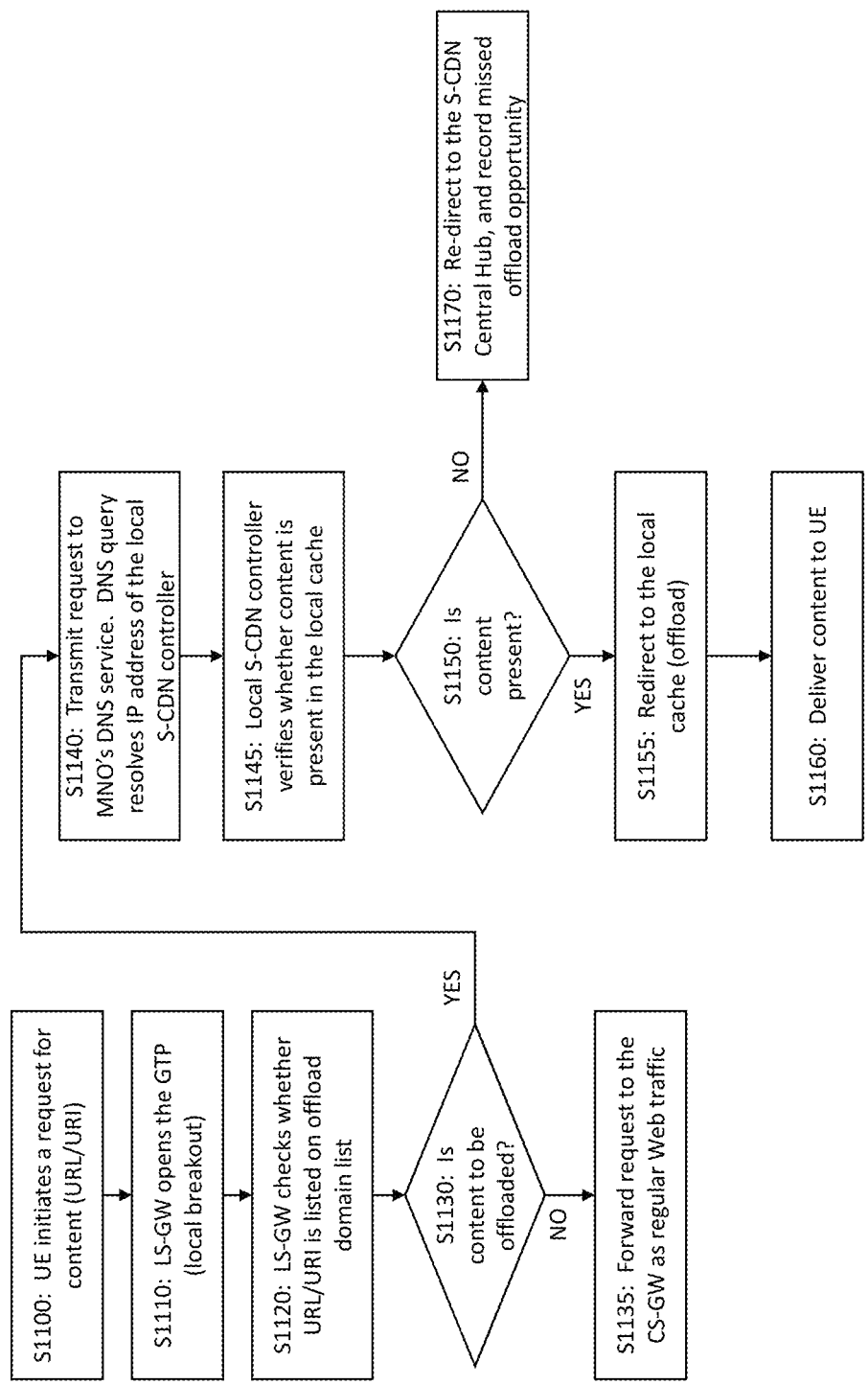

FIGS. 10-11 are flowcharts illustrating examples of a push method of content delivery using the mobile network architecture of FIG. 4 or 5, according to example embodiments. FIG. 10 illustrates an example of a first step in the push method, and FIG. 11 illustrates an example of a second step in the push method.

Operations 51000 to 51020 correspond to operations S800 to S820 of FIG. 8, and thus a repeated description is omitted for conciseness.

In operation S1030, the local S-CDN controller acknowledges that the content is stored and ready to be used. For example, the local S-CDN controller of the S-CDN Device 136 acknowledges that the content is stored in the cache 138, 710, 715 at the edge system 120, and ready to be used.

In FIG. 10, the MNO operator selects the content that is to be delivered to the S-CDN caches at the edge locations. When the content is delivered successfully to the S-CDN caches at the edge locations, the local edge controller acknowledges that the content is present in the local cache and reports back to the controller at the S-CDN central hub location. On the other hand, if the content is not successfully delivered to the S-CDN caches at the edge locations, the controller at the S-CDN central hub location repeats the delivery of the content following a carrousel until the content is acknowledged by all local edge controllers.

Turning to FIG. 11, in operation S1100, the UE initiates a request for content. For example, the UE 110 initiates a request for content located at a universal resource identifier (URI) or a universal resource locator (URL).

In operation S1110, the LS-GW opens the general packet radio service (GPRS) tunneling protocol (GTP) (local breakout). For example, the LS-GW CP 133 opens a tunnel with the eNodeB 126.

In operation S1120, the LS-GW checks whether the URI/URL is listed on an offload domain list. For example, the LS-GW CP 133 checks whether the URI/URL for the content that the UE requested is listed in an offload domain list. The offload domain list is a list of URL/URI for content that will be provided over the S-CDN 140.

In operation S1130, it is determined whether the content is to be offloaded. For example, if the URL/URI of the content is listed on the offload domain list, it is determined that the content is to be offloaded. On the other hand, if the URL/URI of the content is not listed on the offload domain list, it is determined that the content is not to be offloaded.

If the content is not to be offloaded (operation S1130, NO), the request is forwarded to the central S-GW as regular web traffic. For example, the request from the UE is forwarded to the CP-GW 162 and the CS-SW 163 of the central MNO hub 160 as regular web traffic, and the central MNO hub 160 transmits the content to the eNodeB 126 using terrestrial unicast.

On the other hand, if the content is to be offloaded (operation S1130, YES), the request is transmitted to the MNO's DNS service, and a DNS query is performed to resolve the IP address of the local S-CDN controller in operation S1140. For example, the request from the UE may be transmitted from the LS-GW CP 133 to the MNO's DNS service (to be described in more detail later) and the DNS query resolves the IP address of the local S-CDN controller of the S-CDN Device 136.

In operation S1145, the local S-CDN controller verifies whether the content is present in the local cache, and in operation S1150, it is determined whether the content is present. For example, the S-CDN controller of the S-CDN device 136 verifies whether the content is present in the cache 138 at the edge system 120 and determines whether the content is present.

If the content is not present (operation S1150, NO), the request is redirected to the S-CDN central hub, and a record is generated of the missed offload opportunity in operation S1170. For example, the request from the UE is redirected to the S-CDN central hub 148, and a record is generated that the content request was not offloaded.

If the content is present (operation S1150, YES), the request is redirected to the S-CDN Device (i.e., the request is offloaded) in operation S1155. For example, the request from the UE is redirected to the S-CDN Device 136 for servicing.

In operation S1160, the content is delivered to the UE. For example, the content is delivered from the cache 138 at the edge system 120 to the UE 110.

In FIG. 11, when the UE 110 initiates a request to play specific content, the request is intercepted (via local breakout) by the local Serving Gateway (LS-GW CP 133), and the destination address and port are checked against a list of domain addresses and ports that are to be offloaded. If the destinations address and port matches one in the list, the request is sent to the MNO's DNS service by the LS-GW CP 113. The DNS query returns two addresses, a Primary Controller address for a primary controller and a Secondary Controller address for a secondary controller (to be described later). The request is sent to the Primary Controller address, if the Primary Controller is available and the Content is available in the local cache 138 of the S-CDN Device 136. In this case, the Primary Controller will redirect the request to the Edge S-CDN Streamer of the S-CDN Device 136 to start streaming the content to the UE 110. If the Primary Controller is available but the content is not available at the local Edge S-CDN cache 138, the request is re-directed to the Secondary Controller address of the secondary central Streamer of the S-CDN central hub 148. The S-CDN Controller of the S-CDN central hub 148 also keeps track of the number of requests that were not accommodated locally for the specific content as input to the PUSH model. The same re-direct will happen if the Primary Controller is not available (e.g., if the Primary Controller is Down). That is, the Primary Controller is down, the request is re-directed to the Secondary Controller address of the secondary central streamer of the S-CDN central hub 148.

Figure 12:
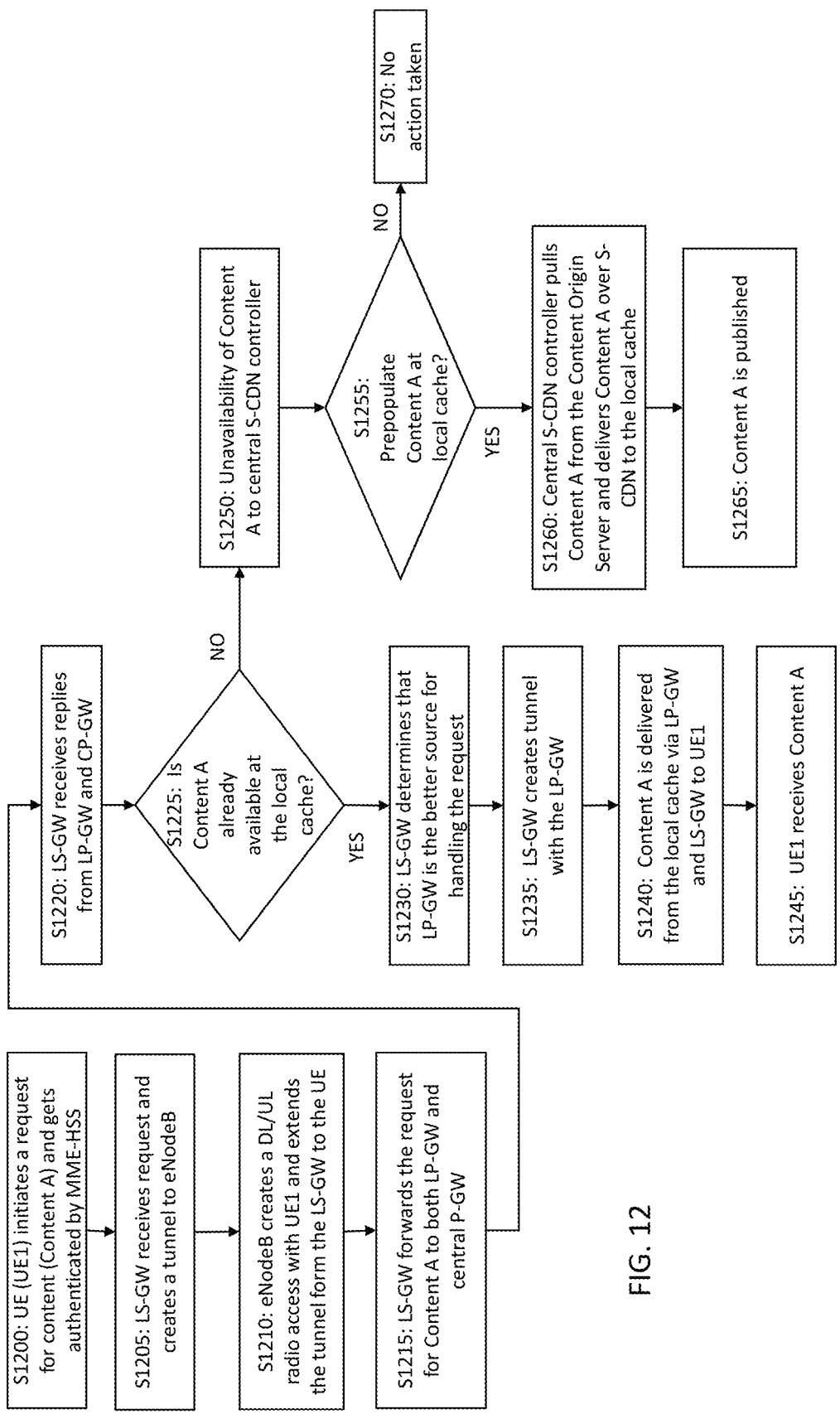
FIGS. 12-13 are flowcharts illustrating examples of a pull method of content delivery using the mobile network architecture of FIG. 3, according to example embodiments.
Figure 13:
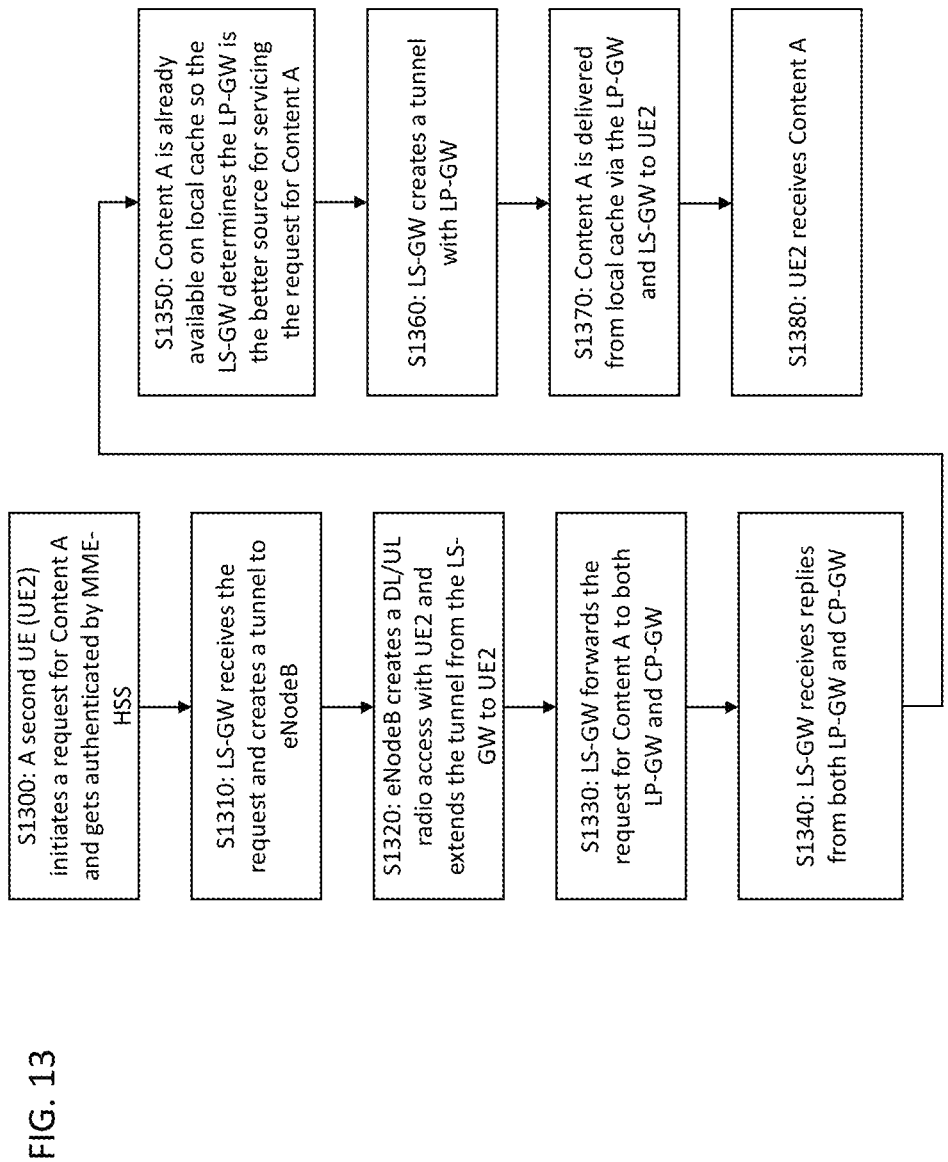

FIGS. 12-13 are flowcharts illustrating examples of a pull method of content delivery using the mobile network architecture of FIG. 3, according to example embodiments. FIG. 12 illustrates an example of a first step in the pull method, and FIG. 13 illustrates an example of a second step in the pull method.

In operation S1200, a UE (UE1) initiates a request for content (Content A) and gets authenticated by MME-HSS.

For example, a first UE 110 initiates a request for Content A and gets authenticated by the MME 166 and HSS 164 of the central MNO hub 160.

In operation S1205, the LS-GW receives the request and creates a tunnel to the eNodeB. For example, the LS-GW 132 receives the request for Content A from the first UE 110, and creates a tunnel from the LS-GW 132 to the eNodeB 126.

In operation S1210, the eNodeB creates a download (DL)/upload (UL) radio access with the UE1 and extends the tunnel from the LS-GW to the UE. For example, the eNodeB 126 creates a DL/UP radio access with the first UE 110 that requested Content A, and extends the tunnel from the LS-GW 132 to the first UE 110.

In operation S1215, the LS-GW forwards the request for Content A to both the LP-GW and the CP-GW. For example, the LS-GW 132 forwards the request for Content A to both the LP-GW 134 in the edge system 120 and the CP-GW 162 at the central MNO hub 160.

In operation S1220, the LS-GW receives replies from the LP-GW and the CP-GW. For example, the LS-GW 132 receives a reply to the request for content from the LP-GW 134 and the CP-GW 162.

In operation S1225, it is determined whether the Content A is already available at the local cache. For example, it is determined whether the Content A is already stored in the local cache 138 of the S-CDN Device 136.

If the Content A is already available (operation S1225, YES), the LS-GW determines that the LP-GW is the better source for handling the request in operation S1230. For example, the LS-GW 132 determines that the LP-GW 134 is the better source for handling the request for the Content A, in the Content A is stored locally.

In operation S1235, the LS-GW creates a tunnel with the LP-GW. For example, the LS-GW 132 creates a tunnel with the LP-GW 134.

In operation S1240, Content A is delivered from the local cache via the LP-GW and the LS-GW to the UE1. For example, the Content A that is requested by the first UE 110 is delivered from the cache 138 of the S-CDN Device 136 to the first UE 110 through the LP-GW 134, the LS-GW 132 and the eNodeB 126 through the tunnels that have been created.

In operation S1245, UE1 receives the Content A. For example, the first UE 110 receives the Content A.

On the other hand, if the Content A is not already available (operation S1225, NO), the unavailability of the Content A is reported to the central S-CDN controller in operation S1250. For example, the edge server 130 may report that the Content A is unavailable to the central S-CDN controller of the S-CDN central hub 148. In some embodiments, the S-CDN device 136 may report that the Content A is unavailable to the central S-CDN controller of the S-CDN central hub 148.

In operation S1255, it is determined whether to prepopulate Content A at the local cache based on preset rules. For example, based on preset rules, the central S-CDN controller of the S-CDN central hub 148 determines whether to prepopulate the Content A at the local cache 138 of the S-CDN Device 136. This determination may be based on the number of UEs 110 that have requested the Content A, and is discussed further below.

If it is determined not to prepopulate the Content A (operation S1255, NO), no action is taken in operation S1270.

On the other hand, if it is determined to prepopulate the Content A (operation S1255, YES), the central S-CDN controller pulls Content A from the Internet and delivers Content A over the S-CDN to the local cache in operation S1260. For example, the central S-CDN controller of the S-CDN central hub 148 pulls the Content A from the Content Origin Server 150 and delivers the Content A over the S-CDN 140 to the cache 138 of the S-CDN Device 136.

In operation S1265, Content A is published. For example, Content A can be made available via the cache 138 at the edge system 120 to all UEs 110 that request Content A.

Turning to FIG. 13, in operation S1300, a second UE (UE2) initiates a request for Content A and gets authenticated by the MME-HSS. For example, a second UE 110 initiates a request for Content A and gets authenticated by the MME 166 and HSS 164 of the central MNO hub 160.

In operation S1310, the LS-GW receives the request and creates a tunnel to the eNodeB. For example, the LS-GW 132 receives the request for Content A from the second UE 110, and creates a tunnel from the LS-GW 132 to the eNodeB 126.

In operation S1320, the eNodeB creates a download (DL)/upload (UL) radio access with the UE2 and extends the tunnel from the LS-GW to the UE2. For example, the eNodeB 126 creates a DL/UP radio access with the second UE 110 that requested Content A, and extends the tunnel from the LS-GW 132 to the second UE 110.

In operation S1330, the LS-GW forwards the request for Content A to both the LP-GW and the CP-GW. For example, the LS-GW 132 forwards the request for Content A to both the LP-GW 134 in the edge system 120 and the CP-GW 162 at the central MNO hub 160.

In operation S1340, the LS-GW receives replies from the LP-GW and the CP-GW. For example, the LS-GW 132 receives a reply to the request for content from the LP-GW 134 and the CP-GW 162.

In operation S1350, Content A is already available on the local cache so the LS-GW determines that the LP-GW is the better source for servicing the request for Content A. For example, Content A is already available on the cache 138 of the S-CDN Device 136 as a result of the request from the first UE (see FIG. 12). In this case, the LS-GW 132 determines that the LP-GW 134 is the better source for servicing the request for Content A from the second UE 110, since Content A has been preloaded to the cache 138 at the edge system 120.

In operation S1360, the LS-GW creates a tunnel with the LP-GW. For example, the LS-GW 132 creates a tunnel with the LP-GW 134.

In operation S1370, Content A is delivered from the local cache via the LP-GW and the LS-GW to the UE2. For example, the Content A that is requested by the second UE is delivered from the cache 138 of the S-CDN Device 136 to the second UE 110 through the LP-GW 134, the LS-GW 132 and the eNodeB 126 through the tunnels that have been created.

In operation S1380, UE2 receives the Content A. For example, the second UE 110 receives the Content A.

In other words, in the second step of the pull method shown in FIG. 13, since the Content A has already been stored in the cache 138 at the edge system 120 in response to the prior request for the same Content A from the first UE in FIG. 12, the Content A may be immediately provided to the second UE 110 from the local cache 138.

Figure 14:
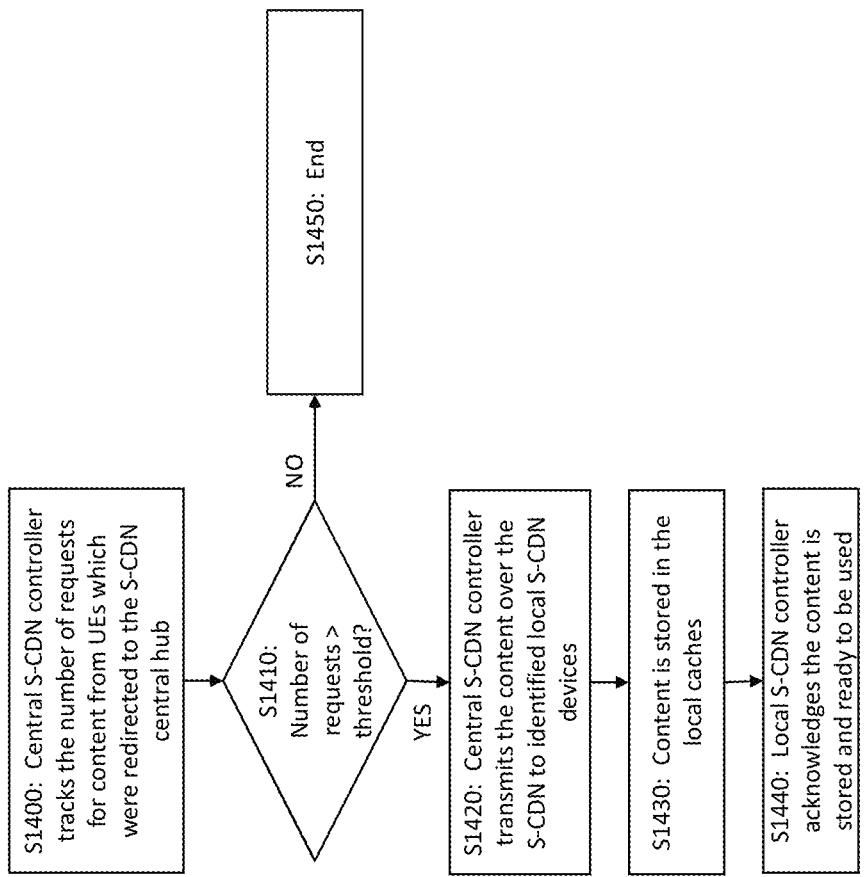
FIG. 14 is a flowchart illustrating an example of a pull method of content delivery using the mobile network architecture of FIG. 4 or 5, according to example embodiments.

FIG. 14 is a flowchart illustrating an example of a pull method of content delivery using the mobile network architecture of FIG. 4 or 5, according to example embodiments. FIG. 14 illustrates an example of a first step in the pull method. The second step of the pull method of content delivery using the mobile network architecture of FIG. 4 or 5 is the same as illustrated in FIG. 13, and thus a repeated description thereof is omitted for conciseness.

Turning to FIG. 14, in operation S1400, the central S-CDN controller tracks the number of requests for content from UEs which were redirected to the S-CDN central hub. For example, the central S-CDN controller of the S-CDN central hub 148 tracks the number of requests for the same content that have been received from a plurality of UEs which were redirected from cache at the edge system 120 to the S-CDN central hub. In other words, when a certain content is not available locally at the edge server and the request is redirected to the S-CDN central hub 148 for processing the request, the central S-CDN controller of the S-CDN central hub 148 keeps track of such requests for each content. For example, a first content may have X requests, whereas a second content may have Y requests.

In operation S1410, it is determined whether the number of requests is greater than a threshold number. For example, the central S-CDN controller of the S-CDN central hub 148 determines whether the number of requests for Content A is greater than a threshold number. For example, whether X is greater than TH.

If the number of requests is not greater that the threshold number (operation S1410, NO), the processing ends in operation S1450.

On the other hand, if the number of requests is greater than the threshold number (operation S1410, YES), the central S-CDN controller transmits the content over the S-CDN to identified local S-CDN caches. For example, the central S-CDN controller of the S-CDN central hub 148 transmits the content A over the S-CDN 140 to caches 138 of S-CDN Devices 136 servicing the UEs that have requested the content A. In some embodiments, the central S-CDN controller of the S-CDN central hub 148 may transmit the content A over the S-CDN 140 to local caches 138 of all S-CDN Devices 136 in a certain region, or to all S-CDN Devices 136. For example, if Content A is determined to be popular content region-wide or system-wide, Content A may be automatically transmitted over the S-CDN 140 to the region in which the Content A is considered to be popular, or to the entire system if the Content A is determined to be popular across the whole system respectively. This may involve multiple thresholds, or thresholds for requests from different regions.

In operation S1430, the content is now stored in the local S-CDN caches. For example, the Content A may be stored in the caches 138 of the S-CDN Devices 136.

In operation S1440, the local S-CDN controller acknowledges the content is stored and ready to be used. For example, the local controller of the S-CDN Devices 136 acknowledge that Content A is stored on the caches 138 of the S-CDN Devices 136, and that Content A is available for immediate unicast transmission from the edge system to any future requesting UEs 110.

In the above descriptions related to FIGS. 8-14, the pull method and the push method are discussed separately. However, the pull method and the push method are not mutually exclusive. In other words, in some example embodiments, it is possible to use the pull method for some content or types of content, and use the push method for other content or types of content. For example, a MNO may determine to use the push method to push content that is determined to be of interest to a large segment of the MNO's subscriber base. Such content may be, for example, live news or sports games which may be of interest to the whole country or to many different countries in the world. The pull method may be used to allow greater determination of content by the UEs located in a particular region, city, or other area. Such content may be a new movie or live local news item, etc.

Figure 15:
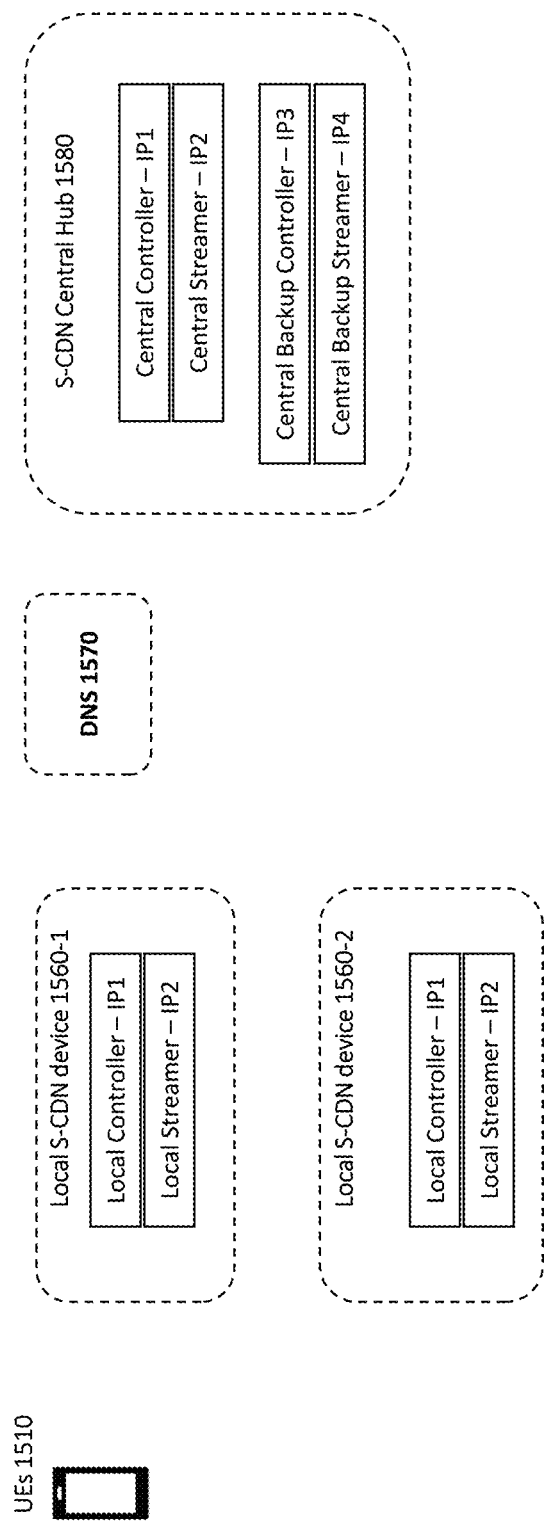
FIG. 15 is an example of a request routing system, according to example embodiments.

FIG. 15 is an example of a request routing system, according to example embodiments. The request routing system may be implemented with any of the mobile network architectures of FIGS. 3-5 and/or with any of the push or pull methods of FIGS. 8-14. The Request Routing system is based on "AnyCast", DNS and "307 re-directs".

The request routing system includes UEs 1510, a first local S-CDN device 1560-1, a second local S-CDN device 1560-2, a DNS 1570, and an S-CDN Central Hub 1580.

The UEs 1510 may correspond to the UEs 110 of FIGS. 3-5. The first local S-CDN device 1560-1 and the second local S-CDN device 1560-2 may correspond to the S-CDN devices of FIGS. 3-5. The S-CDN Central Hub 1580 may correspond to the S-CDN Central Hub 148 of FIGS. 3-5.

The first local S-CDN device 1560-1 includes, a local controller, local cache and a local streamer, and the second local S-CDN device 1560-2 also includes a local controller, a local cache and a local streamer. The S-CDN central hub 1580 includes, among other functions, a central controller and a central streamer, along with a backup central controller and a backup central streamer. All Controllers (local and central) will have the same IP Address IP1, and all Streamers (local and central) will have the same IP Address IP2, and the controller (local and central) and streamer (local and central) will have different IP Addresses from each other (i.e., IP1 is different from IP2), as shown in FIG. 15. The backup central controller and the backup central streamer have a distinctive different IP Address (i.e., IP3 and IP4, which are different from each other, as shown in FIG. 15) to cover a situation in which no edge system 120 is available.

A Streamer Session ID identifying a stream from a local streamer to a UE will be propagated through the Central S-CDN Controller at the S-CDN Central Hub 148, from the Central S-CDN Controller to all local streamers. Therefore, any session created from any streamer is unique, and any streamer may stream the session to a specific UE.

Figure 16:
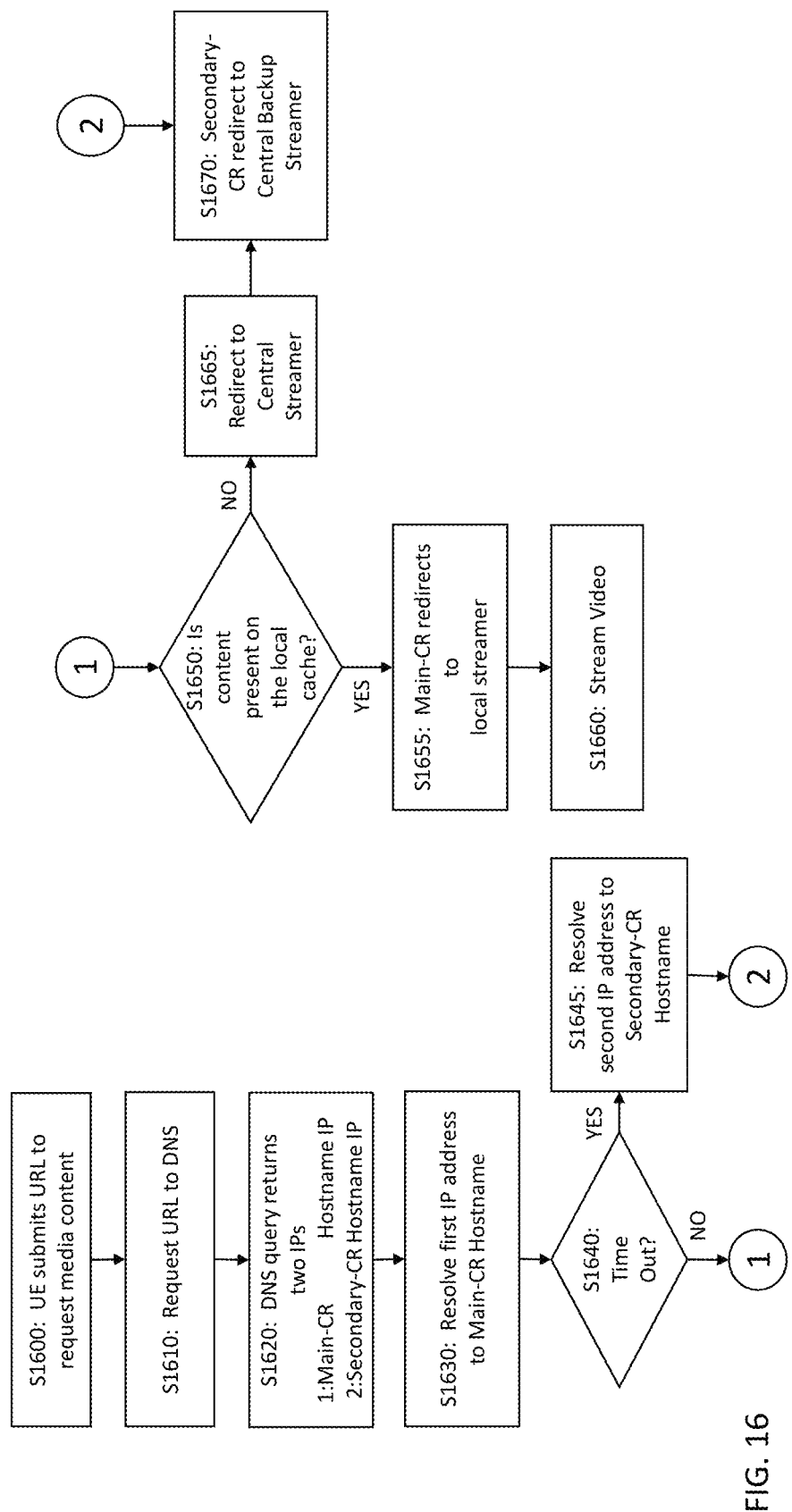
FIG. 16 is a flowchart illustrating a request routing method, according to example embodiments.

FIG. 16 is a flowchart illustrating a request routing method, according to example embodiments. The request routing method will be described with reference to the request routing system of FIG. 15.

With reference to FIGS. 15 and 16, in operation S1600, a UE submits a URL to request media content. For example, a UE 110 may submit a URL to request media content.

In operation S1610, the URL is requested to the DNS. For example, the URL is transmitted from the S-CDN device 1560 serving the UE 110 to the DNS 1570.

In operation S1620, the DNS query returns two IP addresses. For example, the DNS may have entries:

TABLE 1

| 1 | Main-CR | Hostname | IP Address |
| 2 | Secondary-CR | Hostname | IP Address |

In operation S1630, the first IP address is resolved to the Main-CR hostname using the DNS table (see Table 1).

In operation S1640, it is determined if a timeout occurs.

If a timeout has occurred (operation S1640, YES), the second IP address is resolved to the Secondary-CR hostname using the DNS table.

In operation S1670, the secondary-CR redirects to the central backup streamer. For example, the secondary-CR may redirect to the central backup streamer IP4 of the S-CDN Central hub 1580.

On the other hand, if a timeout has not occurred (operation S1640, NO), it is determined whether content is present on the local cache in operation S1650. For example, if a timeout has not occurred, it is determined whether the media content requested by the UE 110 is present in the local cache associated with the local streamer of the S-CDN device 1560 servicing the UE.

If the content is present (operation S1650, YES), the main-CR redirects to the local streamer in operation S1655. For example, the main-CR redirects to the local streamer IP2 at the S-CDN device 1560 servicing the UE.

In operation S1660, the media content is streamed. For example, the media content is streamed from the local streamer IP2 of the S-CDN device 1560 servicing the UE 110.

On the other hand, if the content is not present (operation S1650, NO), the main-CR redirects to the central streamer in operation S1665. For example, the main-CR redirects to the central streamer IP2 at the S-CDN central hub 1580.

In operation S1670, the secondary-CR redirects to the central backup streamer as described above. For example, the secondary-CR may redirect to the central backup streamer IP4 of the S-CDN Central hub 1580.

Figure 17:
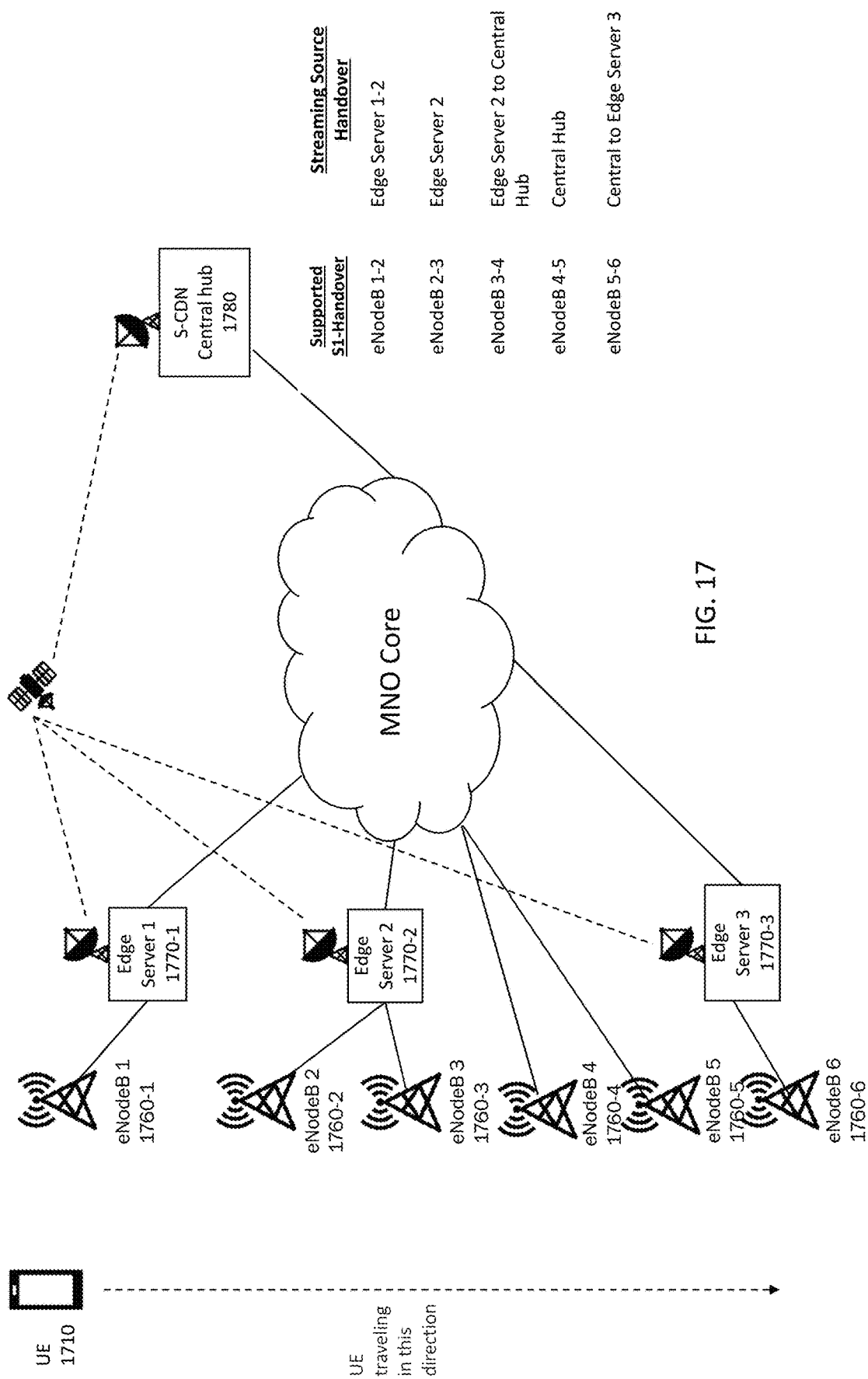
FIG. 17 is an example of a user equipment (UE) handover in an integrated hybrid content delivery system according to example embodiments.

FIG. 17 is an example of a user equipment (UE) handover in an integrated hybrid content delivery system according to example embodiments. With additional reference to FIGS. 15-16, FIG. 17 shows the process of how a UE 1710 that moves from a first coverage area of first eNodeB 1 1760-1 to a second coverage area of a second eNodeB 2 1760-2 may continue to receive a media stream without interruption even during an S1 or X2 handover process. For example, the UE 1710 in FIG. 17 may correspond to the UE 1510 in FIG. 15, the eNodeB 1760 may correspond to eNodeB 126 in FIGS. 3-5, and the edge server 1 1770-1 and the edge server 2 1770-2 may each correspond to the edge server 130 in FIGS. 3-5, or to the edge server 700 in FIG. 7.

The system is designed for seamless media streaming handover between eNodeBs 1760, for example between eNodeB 1 1760-1 and eNodeB 2 1760-2, which in turn causes handover between edge server 1 1770-1 and the edge server 2 1770-2.

The handover is enabled by using three components:
a—IPAnycast on the Local Controllers IP1
b—IPAnyCast on the Local Streamers IP2
c—A unique Session Identification (Session_ID) that is distributed to all the Streamers in the system.

When the UE starts streaming using the S-CDN device of edge server 1 1770-1, a unique Session Identification (Session_ID) is created that allows the UE to sequentially request media segments/packets from the S-CDN device of edge server 1 1770-1, and for the local streamer of the S-CDN device of edge server 1 1770-1 to acknowledge the Session and to keep responding with media segments/packets when requested.

When the Session between the UE and the S-CDN device of edge server 1 1770-1 is locally created by the S-CDN device of edge server 1 1770-1, the Session (i.e., the Session ID) is automatically added to a database at the Central Controller of the S-CDN central hub 1780 and the Session (i.e., the Session_ID) is propagated to all the S-CDN devices in the system.

Once the UE starts moving away from the coverage of a first eNodeB 1760 to another eNodeB 1760, one of several scenarios occurs:

1—When the second eNodeB is served by the same edge server, the UE is handed over (using S1 or X2 handover) from the first eNodeB to the second eNodeB and the media stream continues uninterrupted. For example, when the UE is handed over from eNodeB 2 1760-2 to eNodeB 3 1760-3 in FIG. 17, the UE is handed over using S1 or X2 handover and the media stream continues uninterrupted.

2—When the second eNodeB is served by a different edge server, the UE is handed over (using S1 or X2 handover) from the first eNodeB to the second eNodeB. The local streamer on the edge server serving the second eNodeB will receive HTTP-GET requests from the UE for specific segments/packets for a specific Session_ID. Since the local streamer on the edge server serving the second eNodeB has knowledge of the Session based on its unique Session ID, the local streamer on the edge server serving the second eNodeB will continue to deliver media segments/packets in response to the requests from the UE and the UE will continue to play the media stream uninterrupted. For example, when the UE is handed over from eNodeB 1 1760-1 to eNodeB 2 1760-2 in FIG. 17, the UE is handed over using S1 or X2 handover and edge server 2 1770-2 that serves eNodeB 2 1760-2 starts receiving requests from the UE for specific segments/packets associated with specific Session_ID. Since the edge server 2 1770-2 knows the Session_ID from the central S-CDN hub 1780, the eNodeB 2 1760-2 may continue to play the media stream associated with the Session_ID and the UE experiences the playback of the media stream as uninterrupted.

3—When the second eNodeB is not served by an edge server, the UE is handed over (using S1 or X2 handover) from the first eNodeB to the second eNodeB. In this case, the UE will continue to make HTTP-GET requests to the IPAnyCast address of the local Streamer on the edge server (which as discussed above shares the same IP address IP2). Since there is no edge server on the second eNodeB in this situation, the UE requests will be responded to by the Central Streamer (IPAnyCast) (which as discussed above shares the same IP address IP2) at the S-CDN central hub 1780. From this point the system behaves the same as what is described in 2. For example, when the UE is handed over from the eNodeB 3 1760-3 to the eNodeB 4 1760-4 in FIG. 17, the UE is handed over using S1 or X2 handover and the eNodeB 4 1760-4 starts receiving requests from the UE for specific segments/packets associated with specific Session_ID. Since the eNodeB 4 1760-4 does not know the Session_ID from the central S-CDN hub 1780, the eNodeB 4 1760-4 through DNS lookup redirects the requests to the central streamer of the S-CDN central hub 1780, and the central streamer streams the media stream through the MNO central hub via unicast terrestrial routes.

The foregoing description is illustrative of example embodiments and is not to be construed as limiting thereof. Although a few example embodiments have been described, those skilled in the art will readily appreciate that many modifications are possible in the example embodiments without materially departing from the novel teachings and advantages of the present inventive concept. Accordingly, all such modifications are intended to be included within the scope of the present inventive concept as defined in the claims. Therefore, it is to be understood that the foregoing is illustrative of various example embodiments and is not to be construed as limited to the specific example embodiments disclosed, and that modifications to the disclosed example embodiments, as well as other example embodiments, are intended to be included within the scope of the appended claims.

What is claimed is:
1. A radio base station of a 4G/LTE network, the radio base station comprising:

a base band unit and one or more remote radio heads configured to wirelessly communicate with a user equipment (UE);

a satellite-based content delivery network (S-CDN) device that receives content via multicast from an S-CDN and caches the content; the content comprising live and non-live video content; and a virtual evolved packet core (vEPC) local serving gateway (LS-GW) connected to the S-CDN device and the base band unit, wherein the LS-GW receives a request for content from the UE, determines whether the requested content is cached in the S-CDN device, and when the content is already cached in the S-CDN device, converts the content cached in the S-CDN device from multicast to unicast and streams the converted content via unicast to the UE.

2. The radio base station of claim 1, wherein, when the content is not already stored in the S-CDN device, the LS-GW transmits the request to a central packet data network gateway (CP-GW), creates a tunnel with the CP-GW, receives the content through the tunnel, and delivers the content to the UE.

3. The radio base station of claim 1, wherein, when the content is not already stored in the S-CDN device, unavailability of the content is reported to a central S-CDN hub and the content is delivered to the S-CDN device through the S-CDN.

4. The radio base station of claim 1, further comprising a local packet data network gateway (LP-GW) connected between the LS-GW and the S-CDN device, wherein when the content is already stored in the S-CDN device, the LS-GW controls the LP-GW to obtain the content from the S-CDN device.

5. The radio back station of claim 4, wherein the LS-GW creates a tunnel with the LP-GW to obtain the content from the S-CDN device to deliver to the UE.

6. The radio base station of claim 1, wherein the LS-GW comprises an LS-GW data plane connected to the S-CDN device, and an LS-GW control plane connected to the LS-GW data plane and the base band unit.

7. An edge server of a 4G/LTE network, the edge server comprising:

a satellite-based content delivery network (S-CDN) device that receives content via multicast from an S-CDN and caches the content; the content comprising live and non-live video content; and a virtual evolved packet core (vEPC) local serving gateway (LS-GW) that is connected to the S-CDN device and is configured to connect to an eNodeB, wherein the LS-GW receives a request for content from a user equipment (UE) being served by the eNodeB and creates a tunnel from the LS-GW to the eNodeB, determines whether the requested content is cached in the S-CDN device, and when the content is already cached in the S-CDN device, converts the content cached in the S-CDN device from multicast to unicast and streams the content via unicast through the tunnel to the UE.

8. The edge server of claim 7, wherein, when the content is not already stored in the S-CDN device, the LS-GW creates a tunnel with a central packet data network gateway (CP-GW), receives the content from the CP-GW through the tunnel, and delivers the content to the UE.

9. The edge server of claim 7, wherein, when the content is not already stored in the S-CDN device, the server reports that the content is unavailable and the content is delivered to the S-CDN device through the S-CDN.

10. The edge server of claim 7, further comprising a local packet data network gateway (LP-GW) connected between the LS-GW and the S-CDN device, wherein when the content is already stored in the S-CDN device, the LS-GW controls the LP-GW to obtain the content from the S-CDN device.

11. The edge server of claim 10, wherein the LS-GW creates a tunnel with the LP-GW, receives the content from the S-CDN device through the tunnel with the LP-GW, and delivers the content to the UE.

12. The edge server of claim 7, wherein the LS-GW comprises an LS-GW data plane connected to the S-CDN device, and an LS-GW control plane that is connected to the LS-GW data plane and that is configured to connect to the eNodeB.

13. A system comprising:

a satellite-based content delivery network (S-CDN) central hub; and one or more edge servers in a 4G/LTE network, each of the one or more edge servers comprising:

an S-CDN device that receives content that is multicast via satellite from the central S-CDN hub and caches the content, the content comprising live and non-live video content; and a virtual evolved packet core (vEPC) local serving gateway (LS-GW) that is connected to the S-CDN device, wherein the LS-GW receives a request for content from a user equipment (UE) in wireless communication with the LS-GW, determines whether the requested content is cached in the S-CDN device, and when the content is already cached in the S-CDN device, converts the content cached in the S-CDN device from multicast to unicast and streams the converted content via unicast to the UE.

14. The system of claim 13, further comprising:

a central mobile network operator (MNO) hub comprising a central packet data network gateway (CP-GW), wherein, when the content is not already stored in the S-CDN device, the LS-GW creates a tunnel with the CP-GW, receives the content through the tunnel, and delivers the content to the UE.

15. The system of claim 13, wherein, when the content is not already stored in the S-CDN device, the edge server reports that the content is unavailable to the central S-CDN hub, and the content is delivered from the central S-CDN hub to the S-CDN device via the satellite.

16. The system of claim 13, wherein each of the one or more edge servers further comprises a local packet data network gateway (LP-GW) connected between the LS-GW and the S-CDN device, wherein when the content is already stored in the S-CDN device, the LS-GW controls the LP-GW to obtain the content from the S-CDN device.

17. The system of claim 16, wherein the LS-GW creates a tunnel with the LP-GW, receives the content from the S-CDN device through the tunnel with the LP-GW, and delivers the content to the UE.

18. The system of claim 13, further comprising an eNodeB, wherein the LS-GW comprises an LS-GW data plane connected to the S-CDN device, and an LS-GW control plane connected to the LS-GW data plane and the eNodeB.

19. The system of claim 13, further comprising:
an eNodeB connected to the LS-GW and wirelessly connected to the UE; and
a central mobile network operator (MNO) hub comprising a central packet data network gateway (CP-GW),
wherein each of the one or more edge servers further comprises a local packet data network gateway (LP-GW) connected between the LS-GW and the S-CDN device, and
wherein the LS-GW receives the request for content from the UE being served by the eNodeB and creates a tunnel from the LS-GW to the eNodeB, forwards the request to the LP-GW and the CP-GW and receives replies to the request from the LP-GW and the CP-GW, and determines whether the content is already stored in the S-CDN device, and
when the content is already stored in the S-CDN device, the LS-GW creates a tunnel with the LP-GW and delivers the content from the S-CDN device to the UE through the tunnel with the LP-GW, and
when the content is not already stored in the S-CDN device, the LS-GW creates a tunnel with the CP-GW and delivers the content from the CP-GW to the UE through the tunnel with the CP-GW.

20. The system of claim 13, wherein the one or more edge servers comprise a plurality of edge servers which are geographically separated from one another, and
the system further comprises:
for each edge server, one or more eNodeBs connected to the LS-GW, each of the one or more eNodeBs wirelessly connected to a plurality of UEs being served by the eNodeB; and
a central mobile network operator (MNO) hub comprising a central packet data network gateway (CP-GW) in communication with the LS-GWs, and
first content that is pre-selected by the MNO or a content provider is pushed to the S-CDN devices of at least a portion of the plurality of edge servers, and the plurality of the edge servers pull second content that is in high demand among UEs being served by the one or more eNodeBs connected to the LS-GWs, and
the edge servers deliver content requested by the UEs from among the first content and the second content to requesting UEs.

\* \* \* \* \*